(12) United States Patent
Nono et al.

(10) Patent No.: US 7,013,236 B2
(45) Date of Patent: Mar. 14, 2006

(54) METHODS AND APPARATUS FOR CALCULATING ROUTING ARRANGEMENTS FOR CONTROL CABLES

(75) Inventors: Kazuyoshi Nono, Nagoya (JP); Yoshikatsu Tsuge, Nagoya (JP); Takayuki Ashikawa, Nagoya (JP); Yoshio Misaki, Nagoya (JP); Masami Wakita, Nagoya (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 63 days.

(21) Appl. No.: 10/450,115

(22) PCT Filed: Dec. 12, 2001

(86) PCT No.: PCT/JP01/10872

§ 371 (c)(1),
(2), (4) Date: Jun. 11, 2003

(87) PCT Pub. No.: WO02/48923

PCT Pub. Date: Jun. 20, 2002

(65) Prior Publication Data

US 2004/0059448 A1    Mar. 25, 2004

(30) Foreign Application Priority Data

Dec. 12, 2000   (JP) ............................. 2000-377374

(51) Int. Cl.
*G01R 31/02*    (2006.01)
(52) U.S. Cl. ................... 702/159; 702/183; 324/538
(58) Field of Classification Search ............ 702/33–36, 702/41–43, 113–115, 127, 158–159, 161, 702/179, 183–184; 324/508–512, 538–539, 324/541; 439/512
See application file for complete search history.

(56) References Cited

U.S. PATENT DOCUMENTS

| | | | | |
|---|---|---|---|---|
| 4,935,170 A | * | 6/1990 | Capol ........................ 264/1.28 |
| 4,985,855 A | * | 1/1991 | Aldrich et al. .............. 345/419 |
| 5,505,398 A | * | 4/1996 | Emmerich ................... 242/360 |
| 5,636,138 A | * | 6/1997 | Gilbert et al. ................. 703/1 |
| 5,863,010 A | * | 1/1999 | Boomgaarden ............. 242/388 |

(Continued)

OTHER PUBLICATIONS

Nakamura et al., "Reliability Analysis of Submarine Power Cables and Determination of External Mechanical Protections", Apr. 1992, Power Delivery, IEEE Transactions on, vol. 7 Issue 2, pp. 895-902.*

(Continued)

*Primary Examiner*—Marc S. Hoff
*Assistant Examiner*—Mary Catherine Baran
(74) *Attorney, Agent, or Firm*—Oliff & Berridge, PLC

(57) ABSTRACT

The present invention provides a method for predicting a routing arrangement for control cable without preparing experimental control cables. In the method according to the present invention, characteristics of a control cable to be laid are obtained (S1, S2, and S3). The characteristics of the control cable can be obtained by subjecting a test piece of control cable to a known test (tensile test). Next, a length of the control cable and a condition for connecting the control cable are provided as conditions for a computation (S4 and S5). Then, the given length of the cable, the given condition for connecting the cable, and the obtained characteristic of the control cable are used for a computation model, which was formed by dividing the control cable into a plurality of elements, in order to perform a finite element method, and, thus, a routing arrangement is calculated (S7).

12 Claims, 26 Drawing Sheets

U.S. PATENT DOCUMENTS

| | | | | |
|---|---|---|---|---|
| 6,307,999 B1 * | 10/2001 | Daoud | ................... | 385/135 |
| 6,389,214 B1 * | 5/2002 | Smith et al. | ................ | 385/136 |
| 6,411,919 B1 * | 6/2002 | Davis et al. | ................ | 702/156 |
| 6,489,554 B1 * | 12/2002 | Bertini et al. | ............... | 174/15.6 |

OTHER PUBLICATIONS

"Development of Calculation Technology for Shift Cable Arrangement (On Cable Route and Load Efficiency Analysis by Finite Element Method)"; Kazuhito Kojima et al.; Jidosha Gijutsukai Gakujutau Kouwnkai Zensatsushuu, XX, XX, No. 952, Apr. 20, 1995; pp. 97-100.

"Finite Element Stress Analysis of Cables"; R.H. Knapp et al.; Oceans '99. MTS/IEEE; vol. 2, Sep. 16, 1999; pp. 1026-1033.

"A Three-Node Cable Element Ensuring the Continuity of the Horizontal Tension; A Clamp-Cable Element"; Computers Andstructures Elsevier UK, vol. 74, No. 2; M. Aufaure; Jan. 31, 2000; pp. 243-251.

* cited by examiner (a): Direction of Axis (b): Direction Perpendicular to Axis (c): Bent Direction of Cable (d): Twisted Direction of Cable

METHODS AND APPARATUS FOR CALCULATING ROUTING ARRANGEMENTS FOR CONTROL CABLES

FIELD OF THE INVENTION

The present invention relates to control cables that transmit an input of a manipulating force, which an input side apparatus receives, to an output side apparatus, and more particularly it relates to techniques for estimating routing arrangements for the control cables that are disposed between the input side apparatus and the output side apparatus.

BACKGROUND ART

Known control cables include an outer cable and an inner cable, which is inserted within the outer cable. The inner cable can be axially moved by being guided along the outer cable.

One end of the outer cable is affixed to a housing of an input side apparatus. The other end of the outer cable is affixed to a housing of an output side apparatus. In addition, one end of the inner cable is affixed to a manipulation member (e.g., a manipulation lever) of the input side apparatus. The other end of the inner cable is affixed to a transmission-receiving member (a member to which movement of the manipulation lever is transmitted) of the output side apparatus. When the manipulation member of the input side apparatus is operated, the inner cable axially moves within the outer cable. Consequently, the movement of the manipulation member is transmitted to the transmission-receiving member of the output side apparatus. As is clear from the above description, a routing arrangement of the inner cable coincides with a routing arrangement of the outer cable. Accordingly, a routing arrangement for the control cable is determined by the routing arrangement for the outer cable.

On the other hand, the control cable (i.e. the outer cable) is required to be laid such that the control cable does not interfere with devices that reside between the input side apparatus and the output side apparatus. For this reason, connecting conditions for both the ends of the outer cable (e.g., connected position, connected angle), conditions for an intermediate point at which the outer cable is clamped (e.g., clamping position and clamping manner), and other conditions are variously altered.

However, it is difficult to predict the routing arrangement for the control cable from a degree of deformability (a degree of freedom of the routing arrangement) of the control cable. In order to determine the routing arrangement for the control cable, the connecting conditions, the conditions for the intermediate clamping point, and other conditions have to be first determined based on designer's experience. Then, based upon the thus-determined conditions, experimental devices (an input side apparatus and an output side apparatus) are actually formed. Thereafter, the control cable is connected to the experimental devices. If the control cable, when connected to the experimental devices, interferes with other devices, the above stated process will be repeated. Therefore, in order to determine the routing arrangement for the control cable, the formation of experimental devices and evaluation have to be conducted a number of times, which results in a long development period and a high development cost.

Accordingly, it is an object of the present invention to provide techniques for precisely predicting routing arrangements for control cables.

DISCLOSURE OF THE INVENTION

In the methods according to the present invention, a cable length and a cable connecting conditions may be given as preconditions. The cable length is the length of a control cable. The length of the control cable may be obtained from a planned routing arrangement or from a simple computation. For instance, as the cable length, the length of an outer cable may be used. The cable connecting conditions are conditions for connecting the control cable to an input side apparatus and an output side apparatus. As the cable connecting conditions, for example, connected positions in which both ends of the outer cable are respectively connected, and a direction of the cable axis in each of the connected positions may be given. In addition, the position of a clamping point (intermediate point) at which the outer cable is clamped, and clamping conditions for the clamping point (e.g., slidable or not and rotatable or not) may be given. The cable length and the cable connecting conditions may be appropriately determined by a designer.

Subsequently, a characteristic of the control cable to be laid is obtained. The characteristic of the control cable is the "load-deformation quantity" characteristic (e.g., bending rigidity and torsional rigidity) of a beam as which the control cable is regarded and modeled. The "load-deformation quantity" characteristic may be obtained by submitting a test piece of the control cable to a known test (e.g., a tensile test).

Next, a computation model in which the control cable is divided in a plurality of elements is formed. For instance, the control cable is modeled by using a model in which elements (beams) are axially connected. As a characteristic of each element (beam), the obtained characteristic, which was mentioned above, can be used.

Then, a cable routing arrangement is calculated in such a manner that a given cable length and cable connecting conditions and the obtained characteristic of the control cable are used for the formed computation model in order to perform a numerical analysis. Examples of the numerical analysis method are a finite element method and finite difference method.

In such a method, by performing, for example, the finite element method for the computation model formed by dividing the control cable in the plurality of elements, the routing arrangement for the control cable is calculated. Therefore, the routing arrangement of the control cable can be predicted without actually forming the experimental devices (i.e. input side apparatus and output side apparatus).

In the above described method, the characteristic of the control cable may be preferably obtained in the following manner.

First, a characteristic of the outer cable and a characteristic of the inner cable may be separately obtained. The characteristic of the outer cable is a "load-deformation quantity" characteristic (e.g. bending rigidity and torsional rigidity) of one beam as which the outer cable is regarded and modeled. The characteristic of the inner cable is a "load-deformation quantity" characteristic (e.g. bending rigidity) of one beam as which the inner cable is regarded and modeled. The characteristics can be respectively obtained by separately submitting the test piece of the outer cable and the test piece of the inner cable to a known test. The control cable characteristic is determined by the obtained characteristic of the outer cable and the obtained characteristic of the inner cable.

Many experiments conducted by the inventors confirmed that: (1) the characteristic of the control cable can be determined based upon the characteristic of the inner cable and the characteristic of the outer cable, which eliminates the need to obtain the characteristic of the control cable by conducting experiment with the inner cable inserted within the outer cable; and (2) in order to accurately calculate a routing arrangement for the control cable, the characteristic of the outer cable and the characteristic of the inner cable have to be taken into consideration.

Therefore, in the above method, the characteristic of the outer cable may be stored into a database for each type and, similarly, the characteristic of the inner cable may be stored into a database for each type. Then, the characteristic of the control cable, in which the outer cable and the inner cable are variously combined, can easily be determined.

Cushions may be disposed in terminals (i.e. portions that are connected to the input side apparatus and the output side apparatus) of the outer cable. In this case, the outer terminals are deformed due to the effect of the cushions. As a result, the cable routing arrangement will be greatly influenced. Therefore, preferably, the characteristic of each outer terminal may be obtained and the cable routing arrangement may be calculated taking the obtained outer terminal characteristic into consideration.

The "characteristic of outer terminal" is the relationship between the force that acts on the outer terminal and an amount of deformation of the outer terminal deformed by the force [i.e. deformation characteristic ("stress - distortion" characteristic)]. Specifically, examples of such characteristic are, depending on a direction of the deformation, a deformation characteristic in the direction of the cable axis, a deformation characteristic in a direction perpendicular to the cable axis, a deformation characteristic in the bending direction of the cable, and a torsional deformation characteristic around the cable axis. However, it is not necessary to take all the characteristics into consideration in order to calculate the cable routing arrangement. Instead, only the characteristic that has great influence on the cable routing arrangement may be taken into account in order to calculate the routing arrangement. These characteristics may be obtained by submitting the outer terminal to a known test.

As the outer terminal characteristic, a torsion characteristic may be preferably taken into account. This is because, when the outer terminal is twisted, the direction of the cable axis changes, which exerts great influence on the control cable routing arrangement.

In this case, the routing arrangement may be calculated in the following manner.

Since torque that will act on the outer terminal has not been obtained yet, the torque that will act on the outer terminal is calculated first. Specifically, assuming that torque does not act on the outer terminal, the routing arrangement for the control cable is calculated. Next, the torque that acts on the outer cable terminal is calculated from the calculated routing arrangement. Then, the calculated terminal torque is assumed to act on the outer terminal and the routing arrangement is re-calculated.

In addition, in a state in which the outer cable is connected to the input side apparatus and the output side apparatus (i.e. in the laid state), force is exerted to each outer terminal from the outer cable. The characteristic of the outer terminal may vary due to the force that is exerted from the outer cable. Particularly, in the case the outer terminal includes a cushion, which absorbs vibration, the cushion may be deformed by the force that acts on the outer terminal. As a result, the characteristic of the outer terminal may vary. Therefore, the routing arrangement may be preferably calculated after the characteristic of the outer terminal is corrected by taking the force that acts on the outer terminal into consideration.

For example, a control cable routing arrangement is first calculated without taking a change in the characteristic of each outer terminal into consideration. Next, force that acts on the terminal of the outer cable is calculated from the calculated routing arrangement. Then, the characteristic of the outer terminal is corrected based upon the calculated force that acts on the terminal. Subsequently, the routing arrangement for the control cable is re-calculated using the corrected characteristic of the outer terminal.

In the above described method, an intermediate clamped part of the control cable may be preferably modeled by using a computation model in which the intermediate clamped part is supported by springs (e.g. six freedom degrees (in the directions of an x-axis, a y-axis, and a z-axis and around the x-axis, the y-axis, and the z-axis) from a clamping point (a position in which a clamping device is disposed). That is, an element that is clamped with the clamping device is supported from the clamping point via the spring. As conditions for the computation, the clamped element of the control cable and the position where the clamping device is disposed (i.e., clamping point) are given.

After the intermediate clamped part is modeled and the routing arrangement for the control cable is calculated, whether the position of the clamping point is appropriate or not may be determined based upon a distance between the calculated routing arrangement and the clamping point. For instance, if there is a great distance between the calculated routing arrangement and the position of the clamping position, the control cable may be determined to become detached from the clamping device easily.

By using the routing arrangement that was calculated by the above-described manner, interference between the control cable and other devices, durability, load efficiency, backlash, etc. may be obtained.

For example, bending stress that occurs on each part of the inner cable is obtained from the calculated routing arrangement (i.e. routing arrangement of the outer cable). Next, a stress amplitude, when a manipulation member is a moved, is calculated. Thereafter the magnitude of the obtained stress amplitude is compared with a fatigue limit, which was obtained from an S-N curve. If the stress amplitude is greater than the fatigue limit, the control cable may be determined to have the possibility of being damaged. On the other hand, if the stress amplitude is less than the fatigue limit, the control cable may be determined to have no possibility of being damaged.

Also, by obtaining a total bending angle from the calculated routing arrangement, load efficiency and backlash may also be obtained from the calculated total bending angle. The "total bending angle" is obtained by integrating the bending angles of the overall routing arrangement that was calculated. Further, a part of routing arrangement, which part will be highest in bending stress, may also be specified from a minimum bending radius that is obtained from the calculated routing arrangement. The "minimum bending radius" is the bending radius of the part of routing arrangement, which part has the largest curvature.

BEST MODE FOR PRACTICING THE INVENTION

Figure 1:
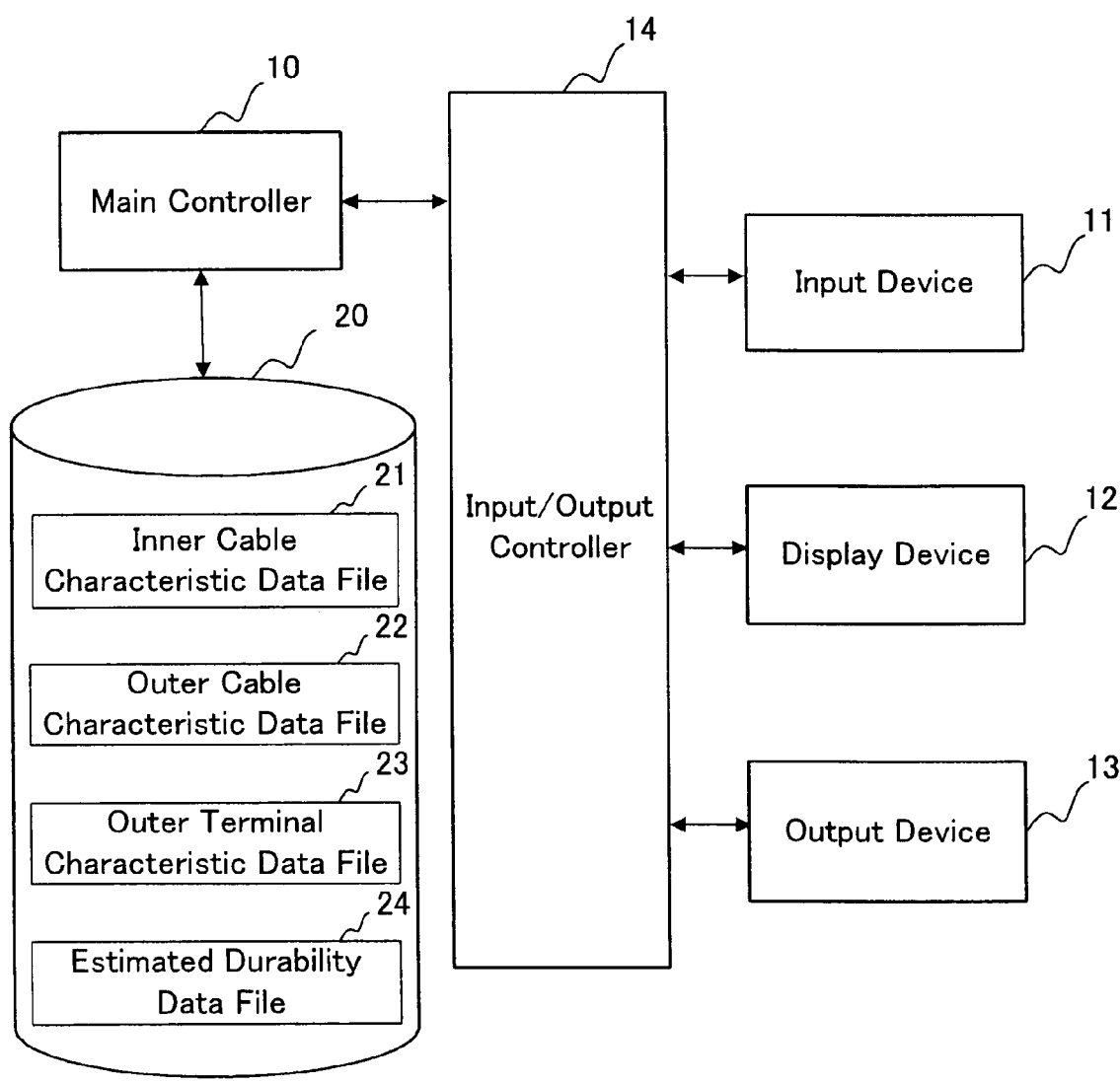
FIG. 1 is a hardware configuration diagram of a routing arrangement calculation apparatus according to a first representative embodiment.

A method according to the present invention can be preferably carried out by using a cable routing arrangement calculation apparatus that utilizes a computer. The cable routing arrangement calculation apparatus may include an input device and an arithmetic unit (processor).

A control cable characteristic, a control cable length, and a condition for connecting the control cable are entered from the input device.

Using the control cable characteristic, the control cable length, and the condition for connecting the control cable, which were entered from the input device, the arithmetic unit performs a numerical analysis (e.g. finite element method) in order to calculate a routing arrangement for the control cable. As a software for the numerical analysis, a finite element method program such as 'ABAQUS' or 'NASTRAN' can be used.

Further, from the calculated routing arrangement, the arithmetic unit may calculate such data as total bending angle and minimum bending radius in order to estimate the durability of the control cable.

As the control cable characteristic that is entered from the input device, an outer cable characteristic and an inner cable characteristic may be separately entered. In this case, the control cable characteristic is determined by the entered characteristic of the outer cable and the entered characteristic of the inner cable.

From the input device, a characteristic of an outer terminal may also be input. In such a case, the routing arrangement is preferably calculated taking the input characteristic of the outer terminal into account.

The above-described apparatus may include a memory device that stores various data.

The memory device may store control cable characteristic data for each type of the control cable. In this case, a type of the control cable is entered from the input device. The arithmetic unit searches the memory device for the entered type of control cable, and reads the characteristic data of the control cable. Then, using the read characteristic data of the control cable, the arithmetic unit calculates the routing arrangement for the control cable.

The memory device may store inner cable characteristic data for each type of the inner cable, and the outer cable characteristic data for each type of the outer cable. In this case, a type of the inner cable and a type of the outer cable are entered from the input device. The arithmetic unit searches the memory device for the entered type of the inner cable and reads the characteristic data of the inner cable. Likewise, the arithmetic unit searches the memory device for the entered type of outer cable and reads the characteristic data of the outer cable. From the read characteristic data of the inner cable and the read characteristic data of the outer cable, the characteristic of the control cable is obtained. In such a case, the optimum combination of the inner cable and outer cable can be found by variously changing the inner cable type and the outer cable type and performing calculations using the characteristic data of the inner cable and outer cable. In particular, since the control cable characteristic is determined by the outer cable characteristic and the inner cable characteristic, the characteristic of each combination of the outer cable and inner cable does not have to be actually measured.

The memory device may store outer terminal characteristic data for each type of an outer terminal. In such a case, a type of the outer terminal is entered from the input device. The arithmetic unit searches the memory device for the entered type of the outer terminal, and reads the characteristic data of the outer terminal. Then, taking the read characteristic data of the outer terminal into account, the arithmetic unit calculates the routing arrangement.

Further, the outer terminal characteristic data may be stored in the memory device for each magnitude of force that acts on the outer terminal. In this case, from the calculated routing arrangement, the arithmetic unit may calculate a force that acts on the outer terminal. Next, the arithmetic unit may read the outer terminal characteristic data corresponding to the calculated force that acts on the terminal. Then, using the read characteristic data, the arithmetic unit may re-calculate the routing arrangement.

The memory device may store planned design data of devices to which the control cable are connected. In such a case, by comparing the design data, which is stored in the memory device, and the routing arrangement, whether the control cable interferes with the device or not may be determined.

Further, the memory device may store design data of components that are disposed in the vicinity of the devices to which the control cable is connected. In this case, whether the control cable interferes with the components or not may be determined by a comparison between the design data of the components, which are stored in the memory device, and the calculated route.

The above-described apparatus may also include a display device in order to display a calculation result.

On the display device, the calculated routing arrangement and the devices to which the control cable are connected may be shown together. Further, the components that are disposed in the vicinity of devices to which the control cable is connected may also be displayed together with the routing arrangement.

(First Representative Embodiment)

A representative embodiment of an apparatus for calculating routing arrangements for control cables will hereinafter be described. First, control cable 50 to be analyzed will be briefly explained with reference to FIGS. 15 and 16.

Figure 15:
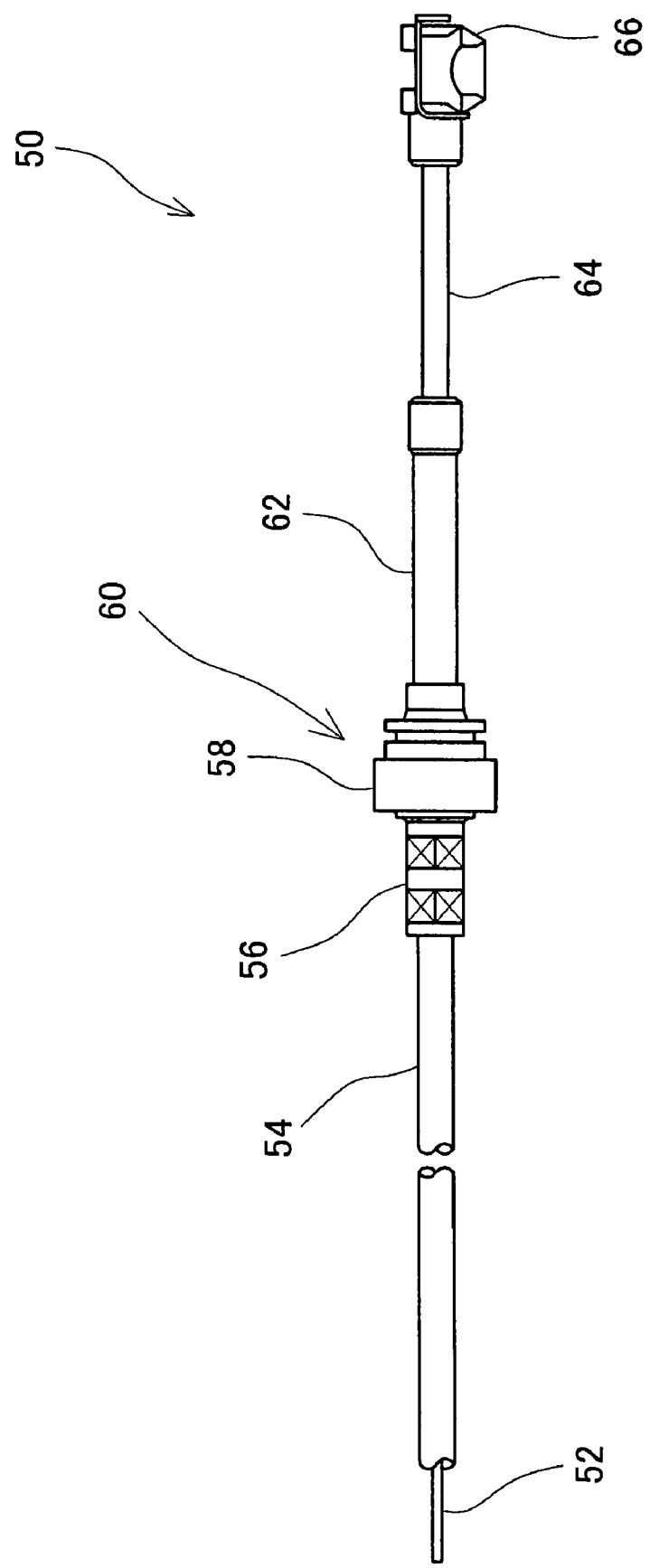
FIG. 15 shows a structure of a control cable to be analyzed.

As shown in FIG. 15, control cable 50 includes outer cable 54 and inner cable 52, which is inserted within outer cable 54.

Outer cable 54 is a cylindrical hollow member. As clearly shown in FIG. 16, sleeve 62 is connected to each end of outer cable 54 via connector 56 swinguably (movably around a central point). Sealing member 64 and cushioning member 66 are disposed on an outer surface of connector 56. Outer cover 58 is fitted on an outer surface of sealing member 64 and an outer surface of cushioning member 66. Outer covers 58 on both ends of outer cable 54 are respectively affixed to, for example, mounting grooves, one of which is formed in a housing of an input side apparatus and the other of which is formed in a housing of an output side apparatus.

Inner cable 52 is made of a plurality of wires (strands) twisted together. As shown in FIG. 15, rod 64 is connected to each end of inner cable 52. Connection portion 66 is provided at one end of each rod 64. One of connection portions 66 is connected to a manipulation lever of the input side apparatus, and the other to a transmission member (a member to which force is transmitted) of the output side apparatus.

In order to lay control cable 50 between the input side apparatus and the output side apparatus, inner cable 52 is first inserted into outer cable 54. Then, the one end of outer cable 54 (outer cover 58) is affixed to the housing of the input side apparatus, and the other end to the housing of the output side apparatus. At the same time, the one end of inner cable 52 (the end of one of rods 64) is connected to the manipulation lever of the input side apparatus, and the other end of inner cable 52 (the end of the other of rods 64) is connected to the transmission member of the output side apparatus.

When the manipulation lever is manually manipulated in such a laid state of control cable 50, rod 64 connected to the manipulation lever is axially slid along sleeve 62. Consequently, inner cable 52 is also slid axially and the movement of the manipulation lever is transmitted to the other rod 62.

Therefore, the function of outer cable 54 is to guide inner cable 52 (i.e. to determine a route of inner cable 52). Accordingly, the routing arrangement of control cable 50 is the same as the routing arrangement of outer cable 54 that is affixed to the housings of the input side apparatus and output side apparatus.

Next, the structure of a cable routing arrangement calculation apparatus will be described with reference to FIG. 1. As shown in FIG. 1, the cable routing arrangement calculation apparatus includes: main controller 10; memory device 20, which is connected to main controller 10; input device 11; display device 12; and output device 13. Input device 11 includes a keyboard, mouse or other pointing devices. Display device 12 may include a display screen, on which a calculated result is shown. Output device 13 includes a printer, which prints the calculated result.

Main controller 10 is a processing unit that controls the cable routing arrangement calculation apparatus as a whole. Main controller 10 comprises an operating system (OS) or other control program, various programs for calculating a routing arrangement for control cable 50 based upon various conditions that were entered, an image processing program for displaying the calculated cable routing arrangement on display device 12, and an internal memory for storing required data.

Memory device 20 is connected to main controller 10. Memory device 20 is a storage means such as a hard disk, a flexible disk, or an optical disk. Memory device 20 stores inner cable characteristic data file 21, outer cable characteristic data file, 22, outer terminal characteristic data file 23, and predictive durability data file 24.

Inner cable characteristic data file 21 is a file containing a characteristic (only bending property) of inner cable 52 for each type of inner cable 52 [classified according to its diameter, how its steel wires are twisted (e.g., a single-strand, a multi-strand) etc]. The characteristic of each inner cable 52 is obtained by actually measuring deflection (mm) when a predetermined bending load (N) is applied to inner cable 52 (only inner cable).

Data obtained from the actual measurement of the amount of deflection of inner cable 52 differs between when the load is applied to inner cable 52 and when the load is removed therefrom (i.e. a so-called hysteresis loop is exhibited). Therefore, in the present embodiment, each average of the data when the load is applied and the data when the load is removed is calculated and then a load-deflection characteristic is obtained from the averages.

Figure 5:
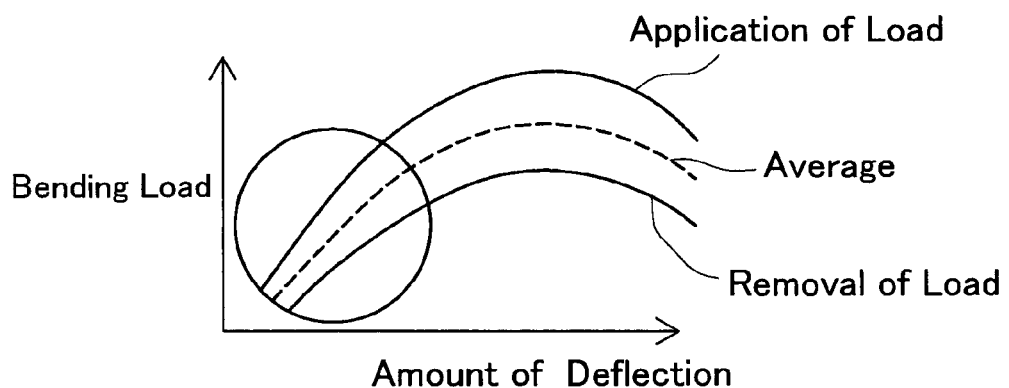
FIG. 5 is another graph showing the control cable characteristic.
Figure 6:
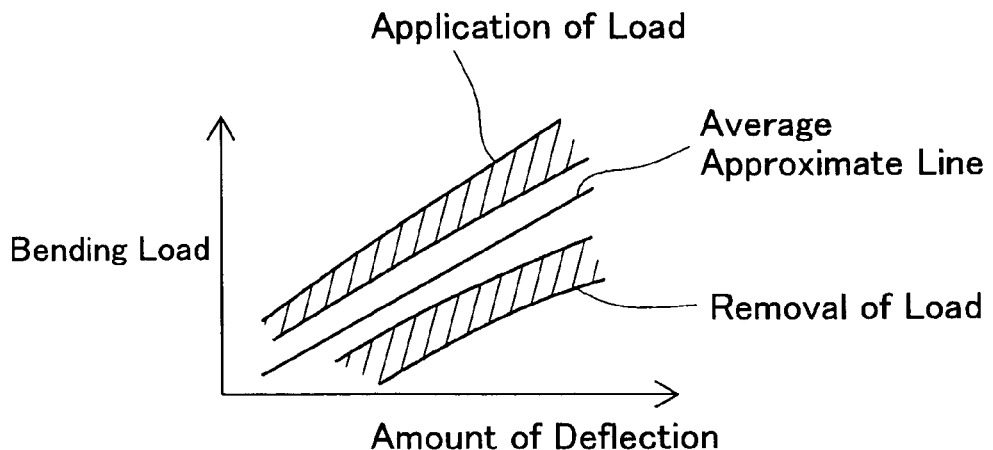
FIG. 6 is an enlarged view showing part of the graph of FIG. 5.

FIG. 5 is a graph showing load-deflection characteristics of control cable 50 (outer cable 54 and inner cable 52). FIG. 6 is an enlarged view of a circled area of FIG. 5. As is clear from FIGS. 5 and 6, the amount of deflection of control cable 50, as in the case of inner cable 52, differs between when a load is applied (indicated by "application of load" in the drawings) and when the load is removed therefrom (indicated by "removal of load" in the drawings). A process for calculating a characteristic value from data obtained when the load is applied and the data obtained when the load is removed will now be explained with reference to FIGS. 5 and 6. First, the area (circled area of FIG. 5) that will be used in a simulation is fetched from the load-deflection characteristics, which were obtained from the experiment. In the fetched area, which is shown in an enlarged size in FIG. 6, a line representing the averages of the amounts of deflection when loads are applied and when the loads are removed is almost straight. Therefore, the gradient of the straight line, which is regarded as the bending rigidity of the cable, is obtained and stored in the characteristic file.

Outer cable characteristic file 22 is a file containing characteristics (bending rigidity and torsional rigidity) of outer cables 54 for each type of outer cable 54 [classified according to, for example, its diameter, its configuration (i.e. a flat wire type, a strand type, etc)]. As in the case of inner cable 52, the characteristic of each outer cable 54 is obtained by actually measuring an amount of deflection (or angle of deflection) when a predetermined bending load (or torsional load) is applied to outer cable 54 (only outer cable).

As in the case of inner cable 52, the data obtained by actually measuring the amount of deflection (or angle of deflection) of outer cable 54 differs between when a load is applied to outer cable 54 and when the load is removed therefrom. Therefore, characteristics of outer cable 54 is also obtained from each average of the data when the load is applied to outer cable 54 and the data when the load is removed therefrom, which average is obtained in the area that will be used in the simulation.

Torsional rigidity of outer cable 54 greatly influences a cable routing arrangement in comparison to torsional rigidity of inner cable 52. Accordingly, the torsional rigidity of outer cable 54 is only considered.

Outer terminal characteristic data file 23 is a file containing a terminal characteristic ("load-deformation" characteristic) for each type of the terminal of outer cable 54 (classified according to, for example, the diameter of the outer cable 54, the type of cushioning member 66, the type of outer cover 58, etc). The deformation characteristics of outer terminals 60 are taken into consideration because of the following reasons.

Figure 16:
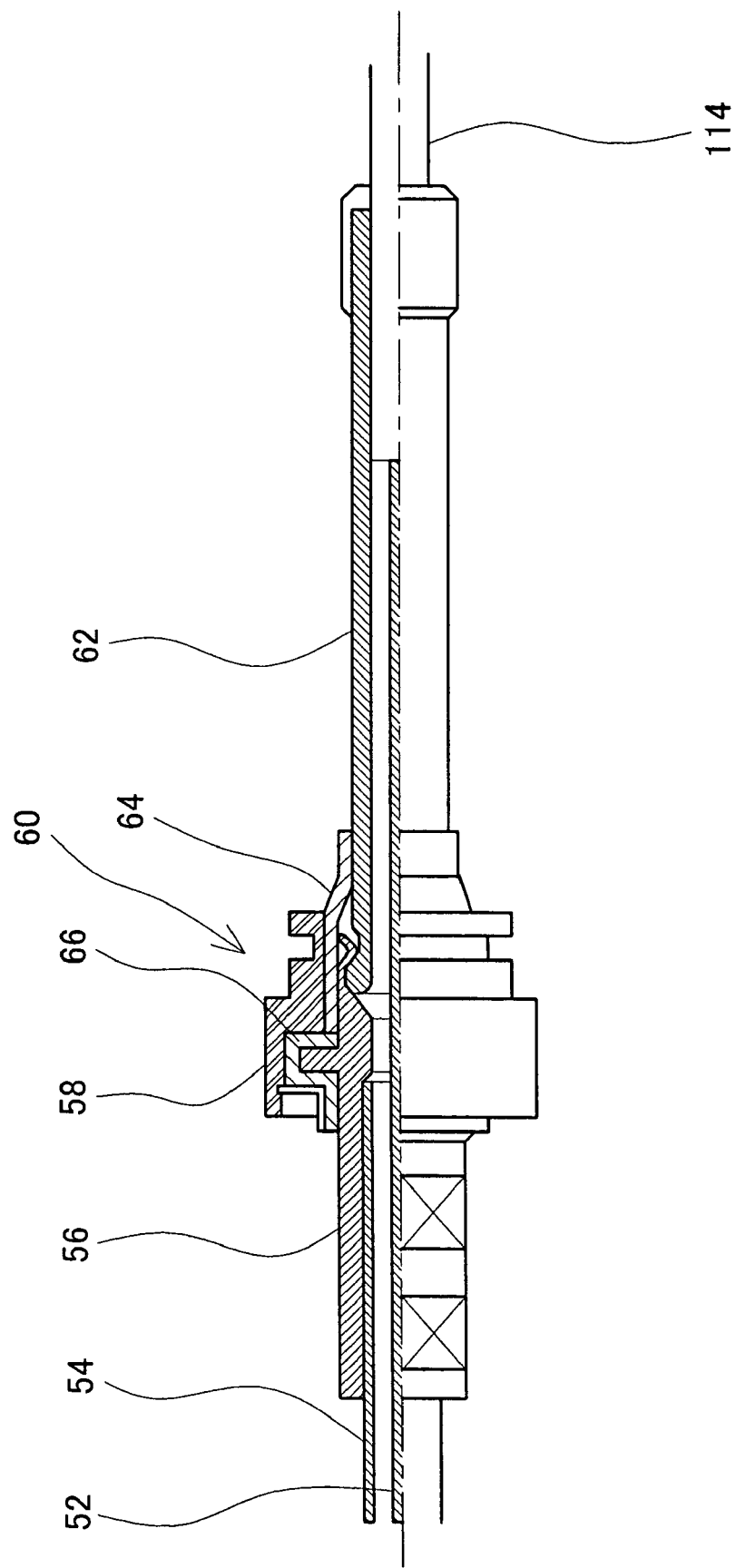
FIG. 16 shows a structure of a terminal of the control cable to be analyzed.

As is clear from the structure of outer terminal 60, which is shown in FIG. 16, when the two outer terminals are respectively connected to the input side apparatus and the output side apparatus, forces (including torque) are respectively applied to connectors 56 (outer terminals 60) from outer cable 54. Two connectors 56 are respectively affixed to the housings of the input side apparatus and output side apparatus via corresponding cushioning members 66 and corresponding outer covers 58. As a result, cushioning members 66 are deformed by the forces applied to corresponding connectors 56. When each cushioning member is deformed, the position of the end of corresponding connector 56 (the position of the corresponding end of outer cable 54) changes. Consequently, the routing arrangement of the cable changes. In addition, when connectors 56 are twisted due to the torque applied to connectors 56, the direction in which outer cable 54 extends from the ends of connectors 56 (the axial direction of the cable) changes. As a result, the routing arrangement of the cable changes.

Figure 7:
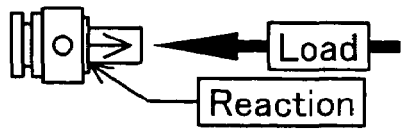
FIG. 7 is a view that explains rigidity directions, each of which is taken into consideration as an outer terminal characteristic.
Figure 7:
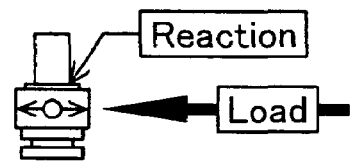
Figure 7:
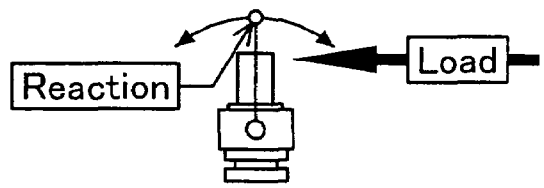
Figure 7:
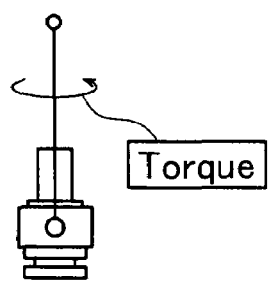

As shown in FIG. 7, deformation characteristics of outer terminals 60, which are taken into consideration, include a load-displacement characteristic in the cable axial direction [FIG. 7($a$)], a load-displacement characteristic in a direction perpendicular to the cable axial direction [FIG. 7($b$)], a load-displacement characteristic in a cable bending direction [FIG. 7($c$)], and a torsional torque-displacement (torsion angle) around the cable axis [FIG. 7($d$)]. The deformation characteristics of each outer terminal 60 are obtained by actually measuring displacement of the end of corresponding connector 56 when predetermined load (torque) is applied to outer terminal 60 in each of the directions shown in FIG. 7.

Figure 8:
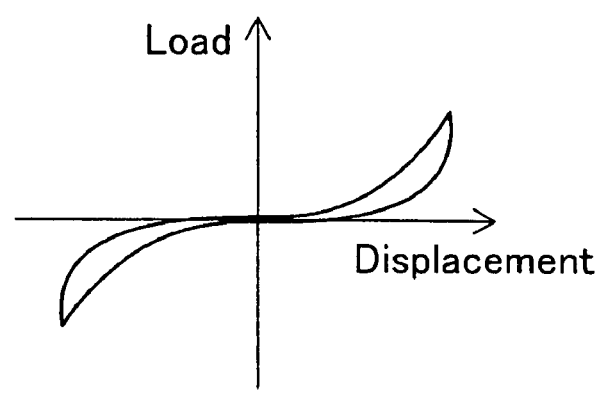
FIG. 8 is a graph for explaining the steps of converting data obtained by actually measuring the outer terminal characteristic into data for use in computation.
Figure 9:
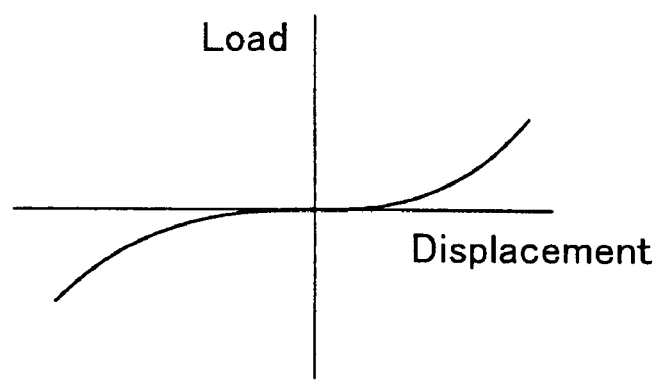
FIG. 9 is another graph for explaining the steps of converting data obtained by actually measuring the outer terminal characteristic into data for use in computation.
Figure 10:
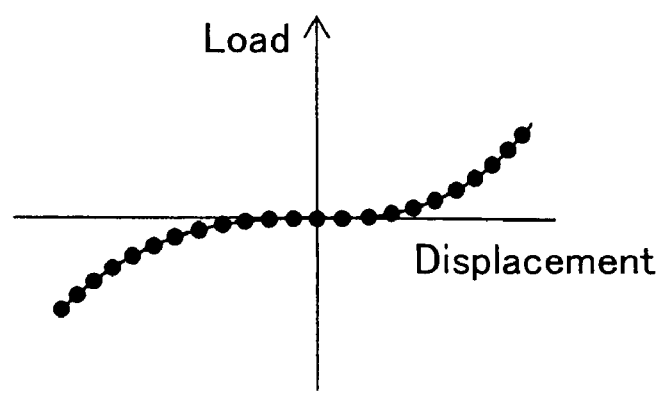
FIG. 10 is another graph for explaining the steps of converting data obtained by actually measuring the outer terminal characteristic into data for use in computation.

The example of FIG. 7($c$) (the load-displacement characteristic in the cable bending direction) will be explained in detail below. FIG. 8 shows data obtained by actually measuring the displacement of outer terminal 60 (specifically, the end of connector 56) applied to the load shown in FIG. 7($c$). As shown in FIG. 8, the "load-displacement" characteristic when the load is applied differs from the "load-displacement" characteristic when the load is removed (i.e., a hysteresis loop is exhibited). Therefore, the average of the data when the load is applied and the data when the load is removed is calculated to obtain a load-displacement characteristic, which is indicated by a single line as shown in FIG. 9. As is clear from FIG. 9, the load-displacement characteristic is not straight. Therefore, as shown in FIG. 10, a set of discrete data (displacement relative to load) is stored in the outer terminal characteristic data file 23. The load-displacement characteristics in the other directions (the direction of the cable axis, the direction perpendicular to the cable axis, and the direction of torsion around the cable axis) are obtained in the same manner as the above-described manner.

In addition, as is clear from FIG. 16, cushioning member 66, which is a component of outer terminal 60, contracts due to the load applied in the axial direction of outer terminal 60 [i.e. in the direction of the cable axis, shown in FIG. 7($a$)]. When cushioning member 66 contracts, the characteristic data of outer terminal 60 greatly changes. Therefore, in the present embodiment, the load-displacement characteristics in the cable bending direction [i.e. in the direction shown in FIG. 7($c$)] are obtained by changing the load, which is applied in the direction of the cable axis, to various values. The load-displacement characteristics in the cable bending directions, which were obtained in such a manner, are stored in outer terminal characteristic data file 23 for each load applied in the direction of the cable axis. The reason for using various load values in order to obtain the load-displacement characteristics in the cable bending direction is that the "load-displacement characteristics" in the cable bending direction greatly influence a cable routing arrangement that will be calculated.

Estimated durability data file 24 is a file containing data that is used in order to estimate the durability of control cable 50 from the calculated routing arrangement. The bending moment of control cable 50 becomes maximum in the smallest bending radius area of the cable routing arrangement. Accordingly, the maximum bending moment that acts on control cable 50 varies with the smallest bending radius. The smallest bending radius is considered to influence the durability of control cable 50. The total bending angle of control cable 50 is also considered to influence the durability of control cable 50. Therefore, variously changing the smallest bending radius and the total bending angle, a durability test was conducted. The results of the durability test are stored in estimated durability data file 24.

Now, a process performed by the cable routing arrangement calculation apparatus in order to calculate a cable routing arrangement will now be explained with reference to a flowchart of FIG. 2.

Figure 2:
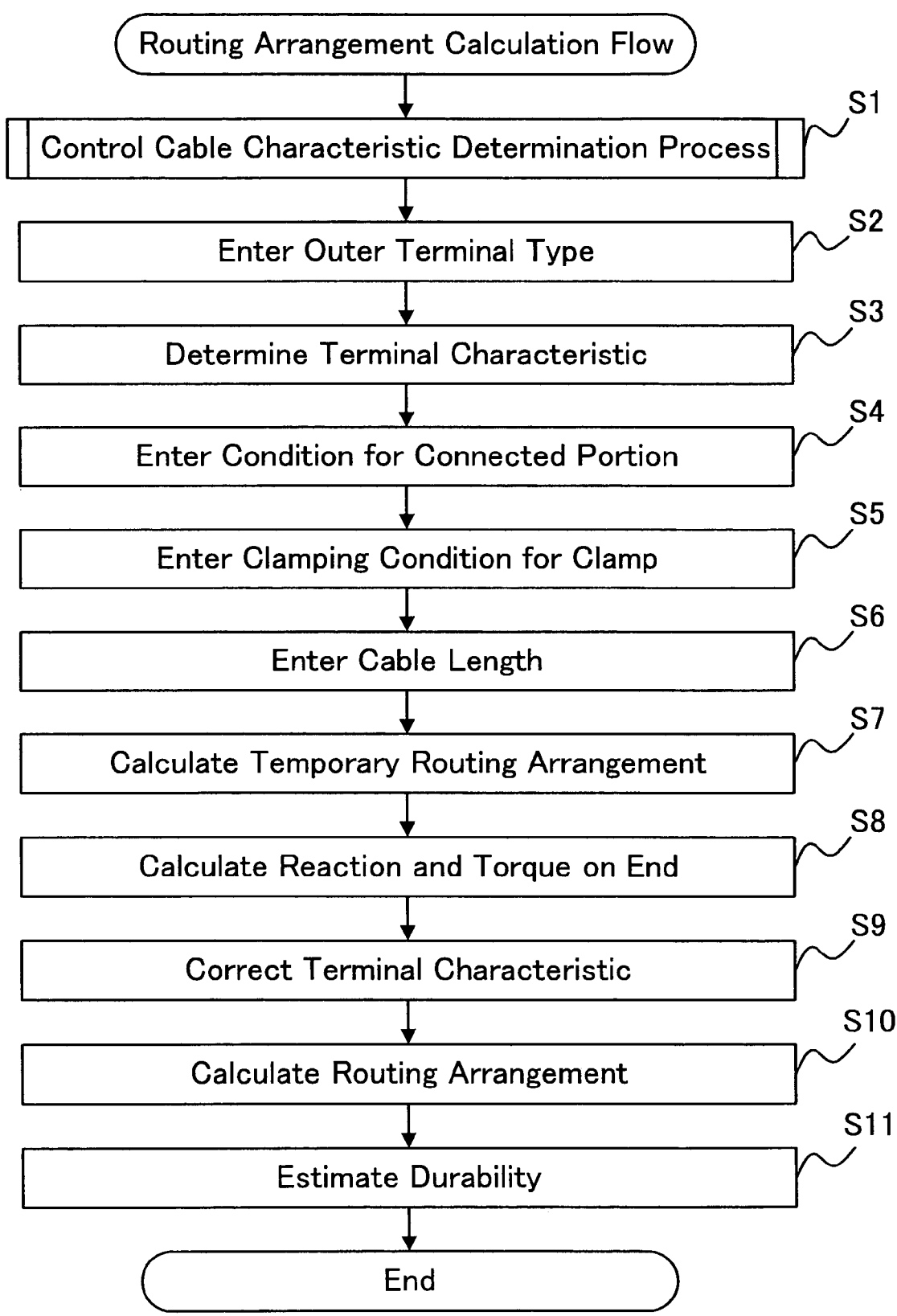
FIG. 2 is a flowchart showing the steps for calculating a routing arrangement.

As shown in FIG. 2, a process of determining a characteristic of control cable 50 is first performed (S1). The process of determining the characteristic of control cable 50 will now be explained in detail with reference to a flowchart of FIG. 3.

Figure 3:
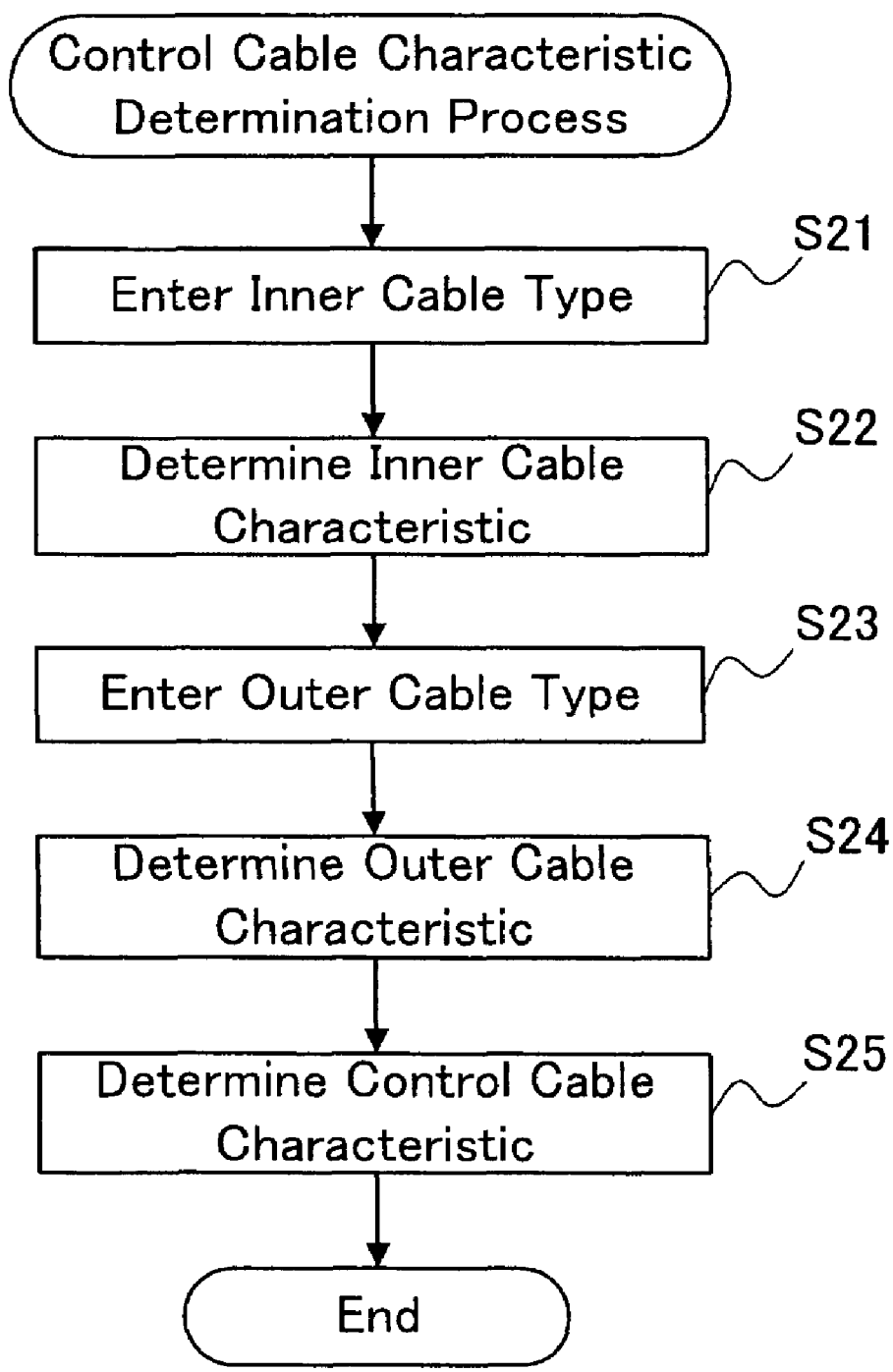
FIG. 3 is a flowchart showing the steps for determining a control cable characteristic.

As shown in FIG. 3, first, a type of inner cable 52 is entered from input device 11 (S21). An entered type of inner cable 52 is stored into the internal memory of main controller 10.

After the type of inner cable 52 is entered, main controller 10 reads from inner cable characteristic file 21 the characteristic (bending rigidity) of inner cable 52, which corresponds to the entered type, (S22). The read characteristic of inner cable 52 is stored into the internal memory of main controller 10.

Subsequently, the type of outer cable 54 is entered from input device 11 (S23).

After the type of outer cable 54 is entered, main controller 10 reads from outer cable characteristic file 22 the characteristic (bending rigidity and torsional rigidity) of outer cable 54, which correspond to the entered type, (S24). The read characteristic of outer cable 54 is stored into the internal memory of main controller 10.

Figure 4:
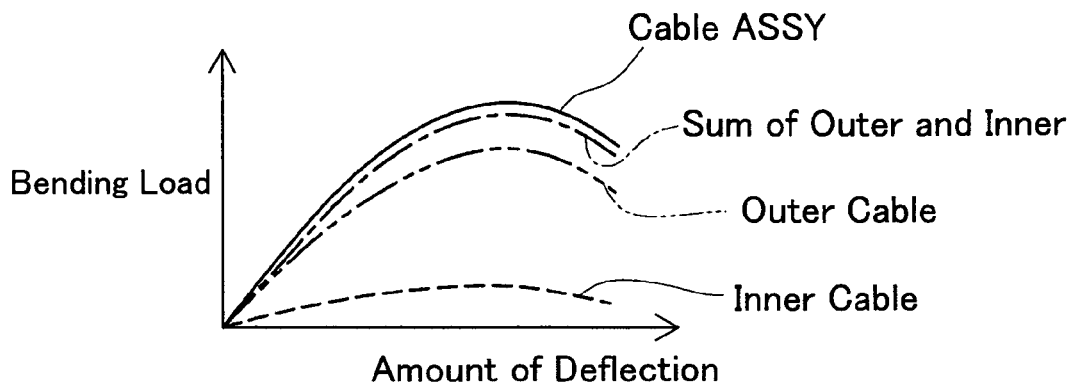
FIG. 4 is a graph showing the control cable characteristic.

After the characteristic (bending rigidity) of inner cable 52 and the characteristic (bending rigidity) of outer cable 54 are read, both the characteristics are added together in order to determine the characteristic (bending rigidity) of control cable 50 (S25). As shown in FIG. 4, the characteristic (bending rigidity) of control cable 50 is substantially equal to the sum of the bending rigidity of outer cable 54 (only outer cable) and the bending rigidity of inner cable 52 (only inner cable), (in the drawing, shown as "outer+inner", which is indicated by a dashed line). Therefore, in step S25, the characteristic of control cable 50 is determined from the read bending rigidity of outer cable 54 (only outer cable) and the read bending rigidity of inner cable 52 (only inner cable). Thus, the need to conduct an experiment in order to obtain bending rigidity of a combination of outer cable 54 and inner cable 52 can be eliminated.

As explained above, the torsional rigidity of outer cable 54 is regarded and used as the torsional rigidity of control cable 50.

After the characteristic of control cable 52 is determined in the above-described manner, the cable routing arrangement calculation flow proceeds to step S2 of FIG. 2 in order to enter the type of the outer terminal.

After the type of the outer terminal is entered, main controller 10 reads from outer terminal characteristic data file 23 characteristic data corresponding to the entered type, (S3). The read characteristic data of the outer terminal is stored into the internal memory of main controller 10. In the step S3, the load-displacement characteristic data in the cable bending direction, when the load in the direction of the cable axis is zero, is read, which is because the load on the outer terminal in the cable axial direction has not been determined yet.

Next, conditions for connection portions of outer cable 54 are entered from input device 11, (S4). Specifically, positional data (x, y, z) and cable axial direction (a, b, c) [unit vector] of the connection portion of each end of outer cable 54 are entered. The entered data is stored into the internal memory of main controller 10.

Subsequently, clamping conditions are entered from input device 11 (S5). Specifically, the clamped position of the part of control cable 50, the coordinates (x, y, z) of a position where the clamping device is disposed, and a clamping condition for the clamping device (whether control cable 50 can be slidable in the axial direction and/or rotatable) are entered. The entered conditions are stored into the internal memory of main controller 10.

Next, the length of control cable 50 is entered from input device 11 (S6). The entered length of control cable 50 (hereinafter called "cable length") may be suitably determined by a designer. One of the advantages of the cable routing arrangement calculation apparatus is that the optimum cable length can be found theoretically. Therefore, the designer can determine the suitable cable length and can judge whether the determined cable length is optimum or not.

Now, an example of a process for finding the optimum cable length by using the cable routing arrangement calculation apparatus will be explained briefly. The optimum cable length is usually determined by the following two steps.

In a first step, a cable length may be determined by a designer (generally, by a designer of a car manufacturer) who designs a device to which a control cable is installed (e.g. a transmission of a car). In the alternative, the cable length may be determined by a geometrical condition, which is determined based upon the conditions for connecting outer cable 54 (i.e. the positions of both the cable ends, cable axial direction). First, by using the determined cable length, a routing arrangement for control cable 50 is calculated. Then, from the calculated cable routing arrangement, the designer judges whether or not the determined cable length satisfies such conditions as the determined cable length being free of interference with other component parts (i.e. a sufficient space being left between the interfering components and the control cable) and the control cable having the smallest bending radius that satisfactorily ensures the durability. If the determined cable length does not satisfy these conditions, the process will proceed to a second step.

In the second step, a plurality of cable lengths are set by increasing or decreasing the cable length that was used in the calculation in the first step. A cable routing arrangement is calculated for each length of cable. Then, interference, the smallest bending radius (durability) of the cable, and other problems are judged for the cable routing arrangement calculated for each length of cable. Among the plurality of lengths of cable, the length of cable that satisfies the optimum conditions is selected in order to prepare an experimental cable. Thus, the number of lengths of cable that are prepared for experiments is decreased.

After a process from step S1 to step S6 is finished, the routing arrangement for control cable 50 is calculated using the calculating conditions that were determined in the above-described steps (S7). The process for calculating the routing arrangement will now be explained with reference to FIGS. 11 and 12.

Figure 11:
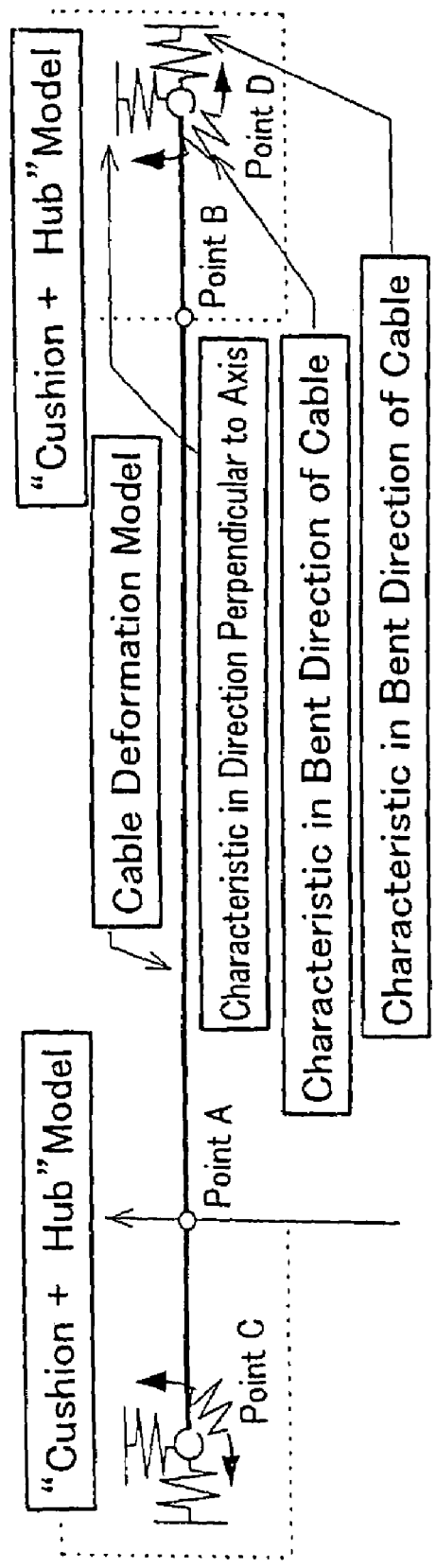
FIG. 11 is a diagram of an analysis model according to the first representative embodiment.
Figure 12:
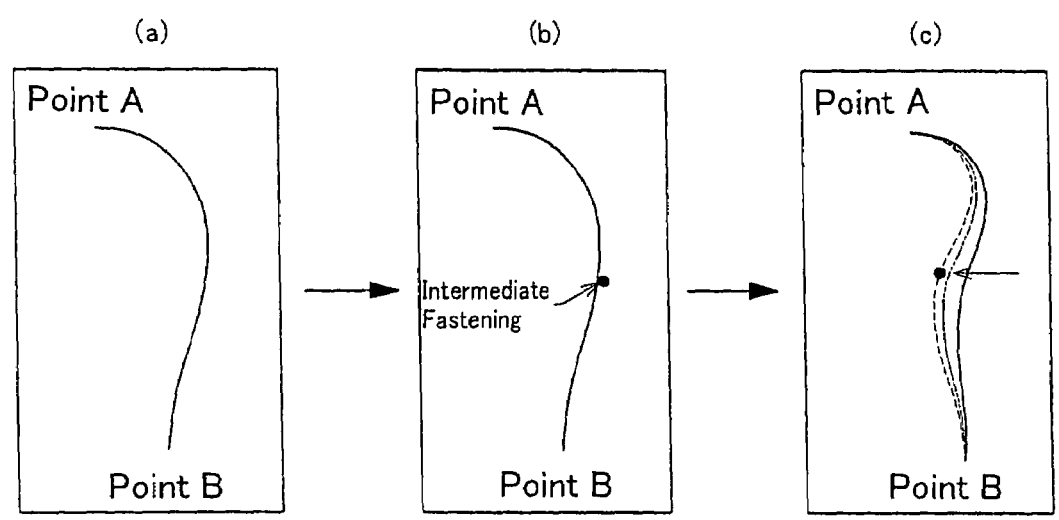
FIG. 12 shows diagrams that explain the steps for performing a specific computation.

First, control cable 50 is modeled by using an analysis model, which is shown in FIG. 11. That is, the terminals (indicated by point C and point D) of control cable 50 are supported: by a spring in the axial direction (a spring that is determined by the load characteristic in the axial direction of the outer terminal); a spring perpendicular to the axis (a spring that is determined by the load characteristic in a direction perpendicular to the axis of the outer terminal); and a spring in a cable bending direction (a spring that is determined by the load characteristic in the bending direction of the outer terminal). In a three-dimensional analysis, each terminal (point C, point D) is supported by springs in two directions perpendicular to the axis.

An area from point C to A (an area from point D to B) corresponds the connector that is attached to each end of outer cable 54, (see FIGS. 15 and 16). The area from point C to A (the area from point D to B) is divided into a plurality of components (beam components). The number of beams into which the area is divided is entered from input device 11 by the designer. In the present embodiment, deformation (torsion) that is caused by torque, which acts on connectors 56, is taken into consideration. This is because if connectors 56 are twisted by the torque acting on both the ends, the cable axial direction at point A and the cable axial direction at point B change, which greatly changes the cable routing arrangement. However, when the routing arrangement is calculated at step S7, deformations of connectors 56, which are caused by the torque acting on both the ends, are not taken into consideration. This is because the torque that acts on connectors 56 has not been found yet.

An area from point A to B corresponds to control cable 50. As the characteristics of the area of control cable 50 (i.e. from the point A to B), the characteristic (bending rigidity and torsional rigidity), which was determined in the control cable characteristic determination process at step S1, are utilized. The area from point A to B is also divided into a plurality of components (beams). The number of beams into which the area is divided is entered from input device 11 by the designer.

After, the computing model is produced in the above described manner, a finite element method is executed. In the present embodiment, general-purpose finite element method software "ABAQUS" was used. The finite element method software is not limited to it in particular, but "NASTRAN", for example, can also be used.

In a computation process, first, one end (point C or D in FIG. 11) is fixed and the other (unfixed end C or D) is moved to the position that was entered at step S4, (refer to FIG. 12(a)). Thus, both the ends of the straight control cable (control cable at the start of the computation) are fixed in the positions that were entered at step S4. A distance by which the end is moved in each computation is one that does not cause computation divergence.

Next, an intermediate fastening (clamp) is disposed at an intermediate clamping point (i.e. the position of the part to which the clamping device is attached) of control cable 50, (refer to FIG. 12(b)). Then, the intermediate fastening is moved to the position that was input at step S5, (refer to FIG. 12(c)). When the intermediate fastening is moved, displacement in the rotating direction and displacement in the axial direction of an element that is clamped by the intermediate fastening (i.e., an element of control cable 50) are taken into account. A distance by which the intermediate fastening is moved in each computation is one that does not cause computation divergence. By the above-described process, the routing arrangement for the control cable is calculated.

After the cable routing arrangement is calculated in step S7, axial force (compressive forces or tensile forces) and axial torque that act on each end of the control cable are calculated (S8).

In step S9, based upon the axial force that was calculated in step S8, the characteristic of the outer terminal is corrected (S9). As explained above, cushioning member 66, which composes outer terminal 60, is deformed by the axial force that acts on outer terminal 60. The deformation of cushioning member 66 greatly changes the deformation characteristic of outer terminal 60. Therefore, in step S9, the characteristic of outer terminal 60 is altered to a characteristic that is obtained when the axial force calculated in step S8 is applied to outer terminal 60. That is, the characteristic of outer terminal 60 used in step S7 (i.e. the characteristic when no force is applied in the axial direction) is altered to the characteristic that is obtained when the axial force calculated in step S8 is applied to outer terminal 60.

As a specific process, axial force that acts on the outer terminal is calculated from the cable routing arrangement that was calculated by the simulation in step S7. Subsequently, the calculated axial force is assumed to act on the terminal of control cable 50, and the characteristic data of outer terminal 60, which corresponds to the axial force (i.e. load-displacement characteristic data obtained when force closest to the force calculated in step S8 is applied to outer terminal 60), is read from outer terminal characteristic data file 23. The read data is stored into the internal memory of main controller 10.

After the characteristic data of outer terminal 60 is corrected at step S9, a cable routing arrangement is calculated again by using the corrected characteristic data (S10). In the calculation in step S10, deformation of each connector 56 due to the torque that acts on connector 56 [the area from point A to C (the area from point B to D)] is taken into consideration.

That is to say, the computation is performed on the assumption that the torque applied to each end (point A, point B), which was calculated in step S8, acts on each connector 56. Using the torsion characteristic of the outer terminal (i.e. data of outer terminal characteristic data file 23), displacement of connector 56 when the torque is applied is calculated [i.e. displacement (torsion angle) at each point A, B is calculated]. The cable routing arrangement calculation process in step S10 is the same as the cable routing arrangement calculation process in step S7. The routing arrangement that was calculated in step S10 is shown on display device 12 and is printed out from output device 13 by an operation, which is performed by an operator.

After the cable routing arrangement is calculated in step S10, the durability is estimated from the cable routing arrangement (S11). Specifically, the smallest bending radius R is calculated from the routing arrangement calculated at step S10, and the total bending angle of the overall routing arrangement is also calculated. Then, a durability estimated-count, which corresponds to the calculated smallest bending radius R, is read from durability estimation characteristic file 24. In addition, a durability estimated-count, which corresponds to the obtained total bending angle, is read from durability estimation characteristic file 24. Of the two estimated counts, the smaller one is regarded as the durability estimated-count. The durability estimated-count is shown onto display 12.

Therefore, in the present embodiment, whether or not control cable 50 interferes with the other devices (components) can be determined from the cable routing arrangement shown on display 12. In addition, whether or not the computed conditions (the connected positions of the cable and the angle of the cable axis) satisfy the durability can be determined from the durability estimated-count shown on display 12.

Figure 13:
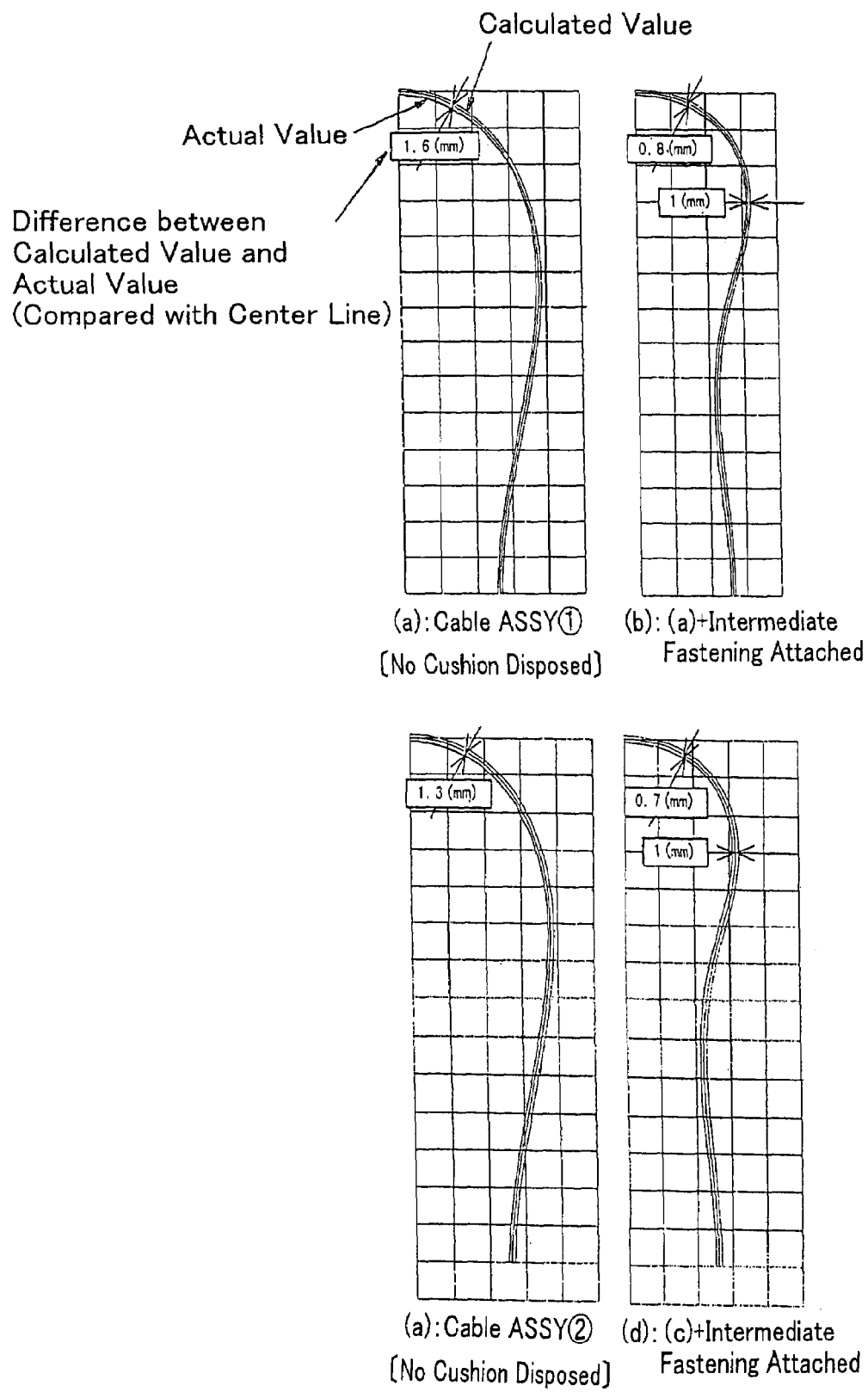
FIG. 13 shows diagrams of examples of a routing arrangement that was computed without taking the outer terminal into consideration.
Figure 14:
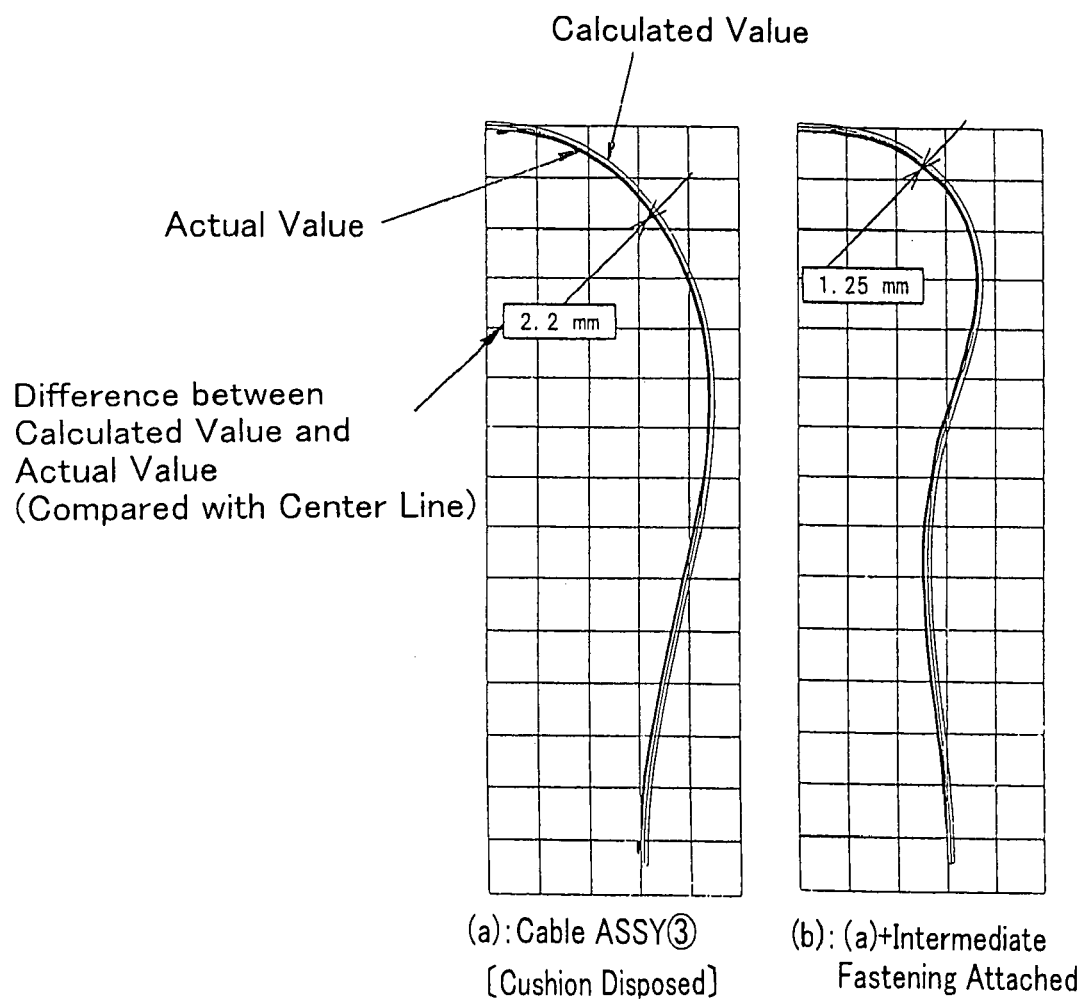
FIG. 14 shows diagrams of another example of the routing arrangement that was computed taking the outer terminal into consideration.

Examples of the cable routing arrangements that were calculated in the above describe manner are shown in FIGS. 13 and 14, together with cable routing arrangements that were actually measured. The examples of the cable routing arrangements of FIGS. 13 and 14 are shown two-dimensionally.

FIG. 13 shows computation examples of two types of control cables (outside diameters 7 mm and 9 mm). The computations were carried out assuming that the cushions were not disposed in the outer terminals (i.e. three spring constants that represent the outer terminal characteristics are given such high values that outer terminal deformation can be ignored).

In FIG. 13, the control cable of φ7 mm is shown as cable ASSY (1) and the control cable of φ9 mm is shown as cable assay (2). FIG. 13(a) shows the cable routing arrangement, which was calculated assuming that an intermediate clamping means was not attached to cable ASSY (1). FIG. 13(b) shows the cable routing arrangement, which was calculated assuming that the intermediate clamping means was attached to cable ASSY (1). FIG. 13(c) shows the cable routing arrangement, which was calculated assuming that the intermediate clamping means was not attached to cable ASSY (2). FIG. 13(d) shows the cable routing arrangement, which was calculated assuming that the intermediate clamping means was attached to cable ASSY (2). In each of FIGS. 13(a) to 13(d), the cable routing arrangement, which is indicated by a single thick line, is one that was actually measured. The other cable routing arrangement, which is indicated by two thin lines (one indicates the inside of the outer cable and the other indicates the outside thereof) was obtained by the calculation. In each of the drawings, a numeric value that is enclosed in a rectangle indicates a difference (mm) between the cable routing arrangement that was computed and the cable routing arrangement that was actually measured. As is clear from each drawing, it was confirmed that a difference between the computed routing arrangement and the actually-measured routing arrangement is very little and both the routing arrangements are almost the same.

FIG. 14 shows examples of the computations that were performed assuming that the outer terminal (for use in automatic transmission) was combined with the control cable (outside diameter 7 mm) (hereinafter the combination will be called "cable ASSAY (3)". FIG. 14(a) shows a routing arrangement for cable ASSY (3), which was calculated assuming that the intermediate clamping means was not attached to cable ASSY (3). FIG. 14(b) shows a routing arrangement for cable ASSY (3), which was calculated assuming that the intermediate clamping means was attached to cable ASSY (3). The thick lines, thin lines and numeric values in FIGS. 14(a) and 14(b) represent the same meanings as those of FIGS. 13(a) to 13(d). As is clear from FIG. 14, it was confirmed that even if the outer terminal is combined with the control cable, the cable routing arrangement that was obtained by the computation and the cable routing arrangement that was actually measured are almost the same.

As clearly stated above, the routing arrangement for the control cable can accurately be predicted by computing the route with the aid of the cable routing arrangement calculation apparatus, which was described above. Therefore, since the optimum conditions can be narrowed down to a certain degree by the computations, the number of times that experimental cables are prepared can be decreased. Accordingly, a development period for the control cable can be shortened.

(Another Example of the Computation)

Figure 17:
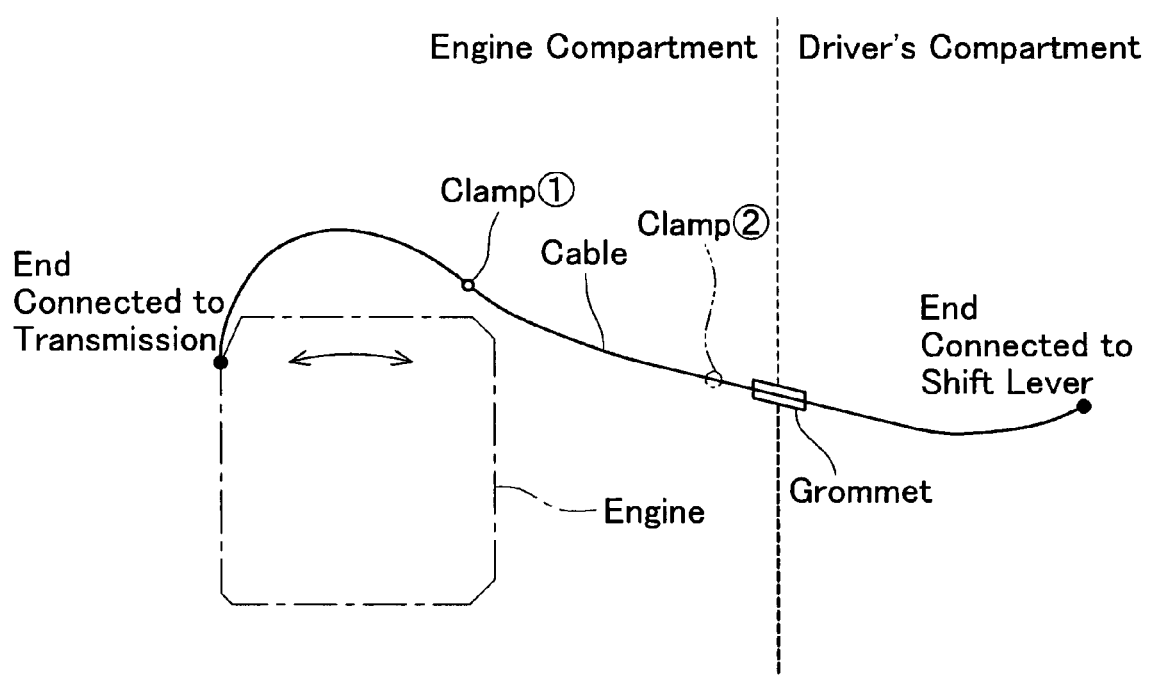
FIG. 17 schematically shows a relationship between the control cable and a transmission device of a vehicle when the control cable is laid in the transmission device.

Next, an example of a cable routing arrangement that was calculated by the above described cable routing arrangement calculation apparatus in order to lay the control cable in a gear shifter of a vehicle will be discussed. FIG. 17 schematically shows the relationship between the gear shifter of the vehicle and the control cable that was laid in the gear shifter.

The vehicle gear shifter includes a shift lever device, which is an input side apparatus, and a transmission device, which is an output side apparatus. The shift lever device is disposed in a driver's compartment. The transmission device is generally mounted in adjacent to an engine, which is disposed in an engine room. The control cable is laid between the shift lever device and the transmission device.

With reference to FIG. 17, one end of the control cable is connected to the shift lever device. The other end of the control cable is connected to the transmission device. A through-hole, through which the control cable is passed, is defined in a boundary wall between the engine room and the driver's compartment. A clearance between the through-hole and the control cable is sealed by a grommet (sealing member).

Two parts of the control cable are clamped in the engine room. The one part (clamp (1)) is disposed above an upper surface of the transmission device and near the back of the transmission device. The other part (clamp (2)) is disposed near the grommet.

Figure 18:
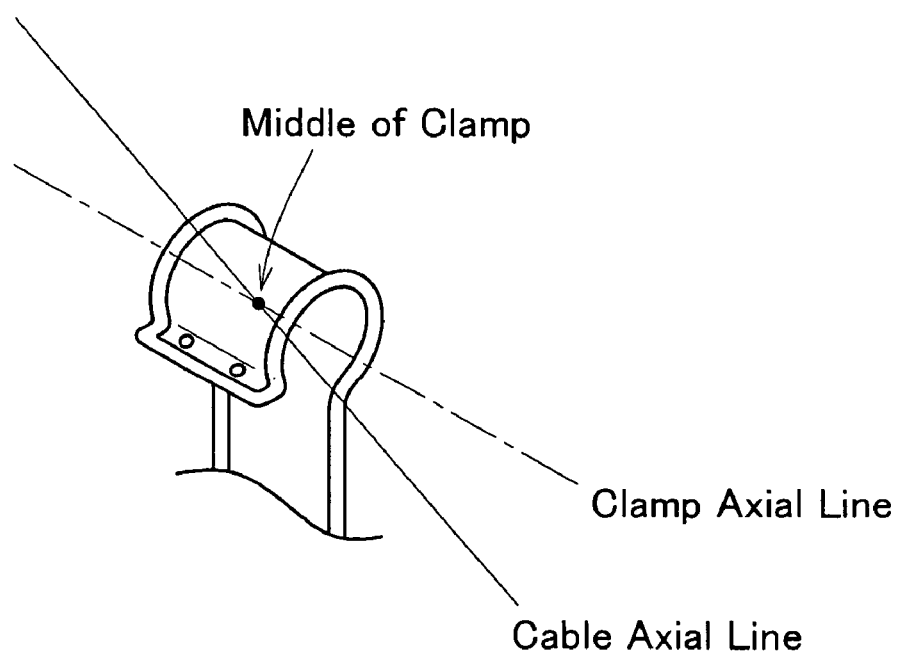
FIG. 18 is a perspective view of a clamping device that clamps the control cable.

The clamping device that clamps the control cable is depicted in FIG. 18. As shown in FIG. 18, each clamping device is formed by bend-processing a plate. The control cable is attached to the clamping device by being pushed into an annular portion of the clamping device from an opening thereof. As is obvious from FIG. 18, the clamping device may fall off the control cable easily when a force in the direction of the opening is exerted to the control cable.

Figure 19:
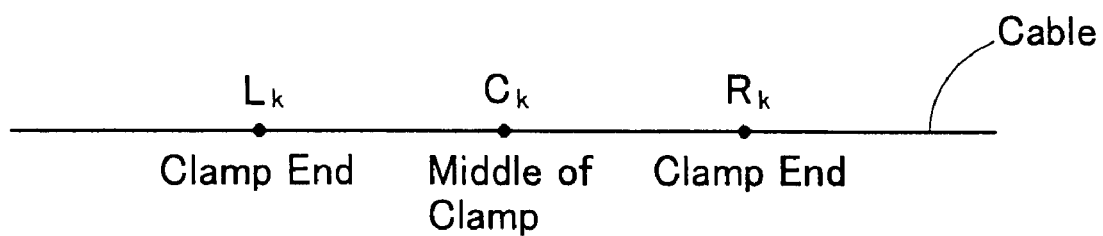
FIG. 19 is an enlarged view showing a relationship between the clamping device and control cable nodes defined on a part that is clamped by the clamping device.
Figure 20:
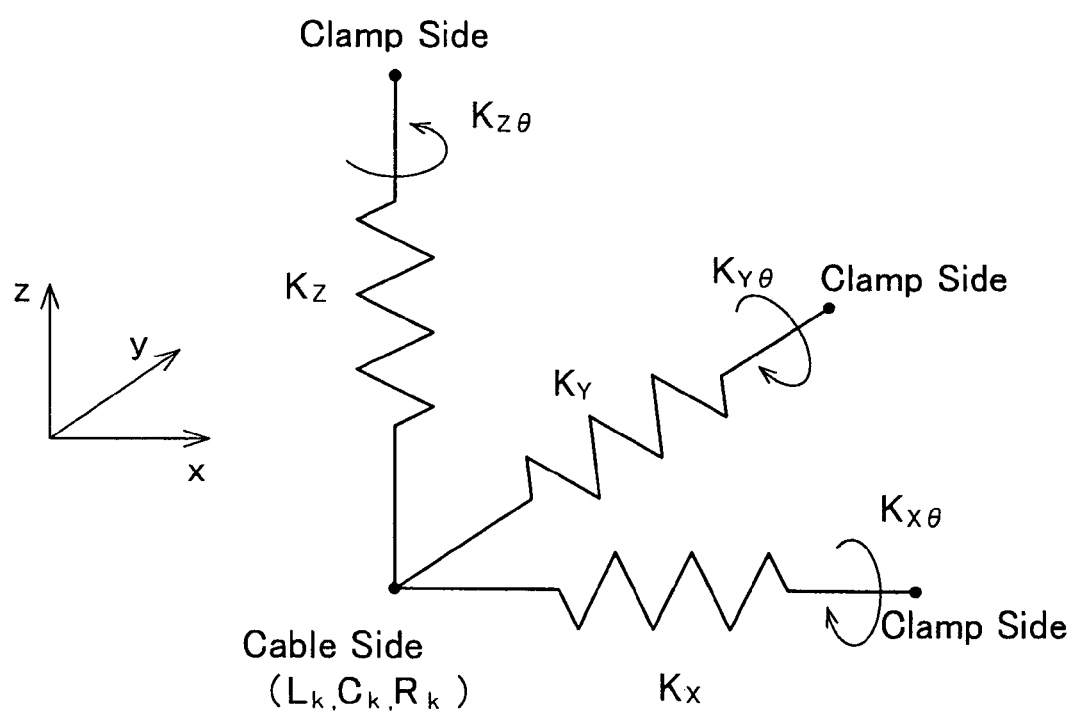
FIG. 20 shows diagrams of a computation model of the clamping device that clamps each node.

Now, the modeling of the clamping devices will be described with reference to FIGS. 19 and 20. In FIG. 19, control cable nodes (nodes of the elements into which the control cable was divided), which respectively correspond to the clamped parts, are enlarged for purposes of illustration. FIG. 20 shows a computation model of each clamping device that clamps corresponding node.

As shown in FIG. 19, the control cable is divided into the plurality of elements such that the three nodes of the control cable respectively correspond with point $L_k$ at the left end, point $C_k$ at the middle, and point $R_k$ at the right end of each clamping device.

Nodes $L_k$, $C_k$, and $R_k$ are supported by a spring mechanism having six freedom degrees. That is, nodes $L_k$, $C_k$, and $R_k$ are supported from the clamping points by: spring $K_x$ in the direction of an x-axis; spring $K_{x\theta}$ around the x-axis; spring $K_y$ in a y-axis; spring $K_{y\theta}$ around the y-axis; spring $K_z$ in the direction of a z-axis; and spring $K_{z\theta}$ around the z-axis. The constant of each of the six springs are suitably determined according to conditions for clamping the control cable (e.g. slidable or not, rotatable or not). Each clamping point corresponds to the position where the corresponding clamping device is disposed [e.g. coordinates (x, y, z)]. In the case of the clamping device of FIG. 18, the clamping points are provided in correspondence with nodes $L_k$, $C_k$, and $R_k$. As is clear from the clamping device shape, the three clamping points corresponding to nodes $L_k$, $C_k$, and $R_k$ are disposed on a straight line. The straight line serves as a clamp axial line, which is shown in FIG. 18. By using such a computation model, the routing arrangement for the control cable can be calculated taking clamping device deformation and other influences into consideration.

Depending on the types of clamping devices, computation models other than the one that is shown in FIGS. 19 and 20 can be used. For instance, in a clamping device that freely rotatably clamps the cable, only one node (point $C_k$ in the middle) of the control cable is clamped by the clamping device. In the same manner as the above-described manner, the node is supported by a spring that has six freedom degrees.

Figure 21:
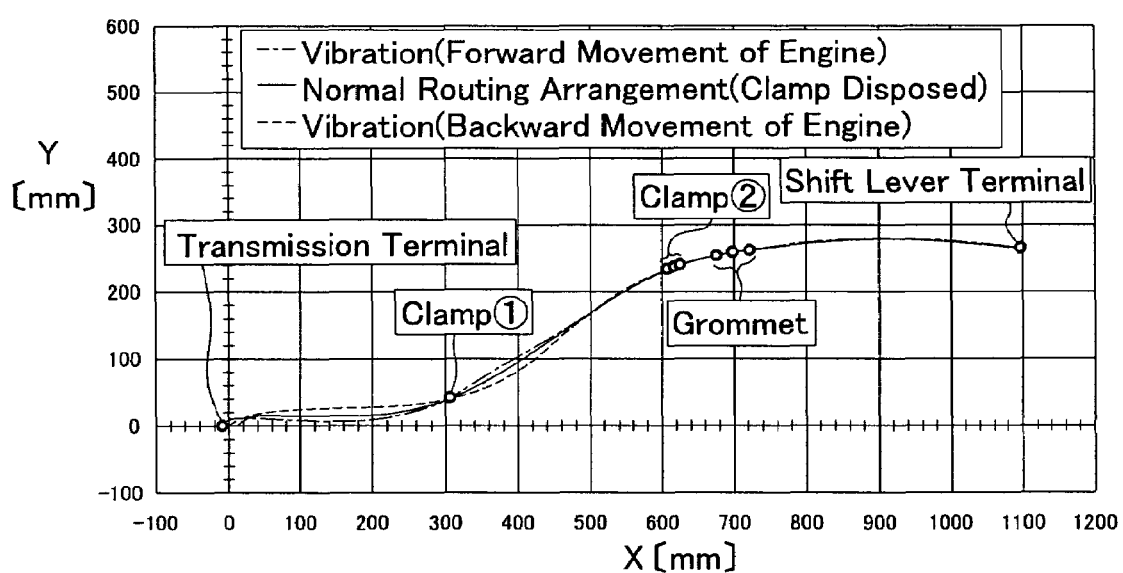
FIG. 21 is a graph (x-y plane) showing the control cable routing arrangement that was calculated assuming that the clamping device was disposed near a grommet.
Figure 22:
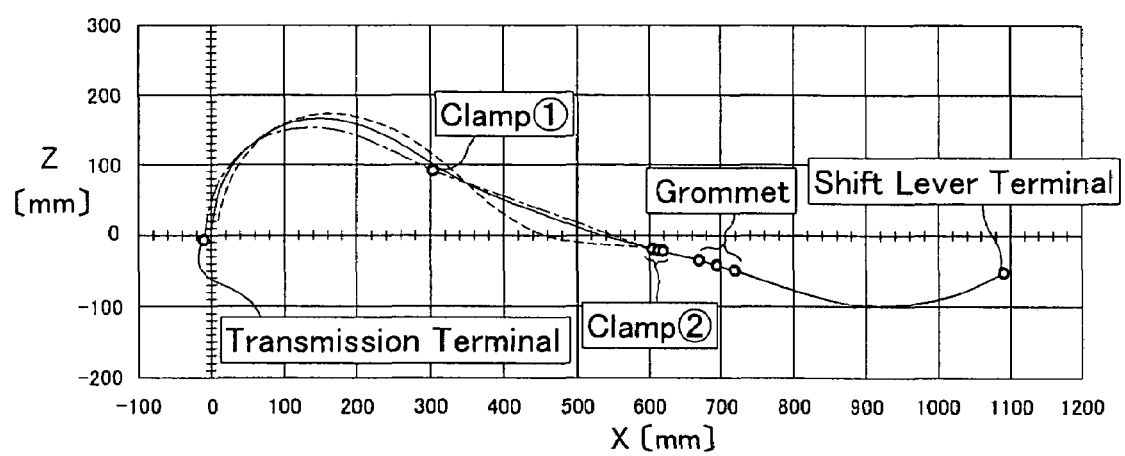
FIG. 22 is another graph (x-z plane) showing the control cable routing arrangement that was calculated assuming that the clamping device was disposed near the grommet.
Figure 23:
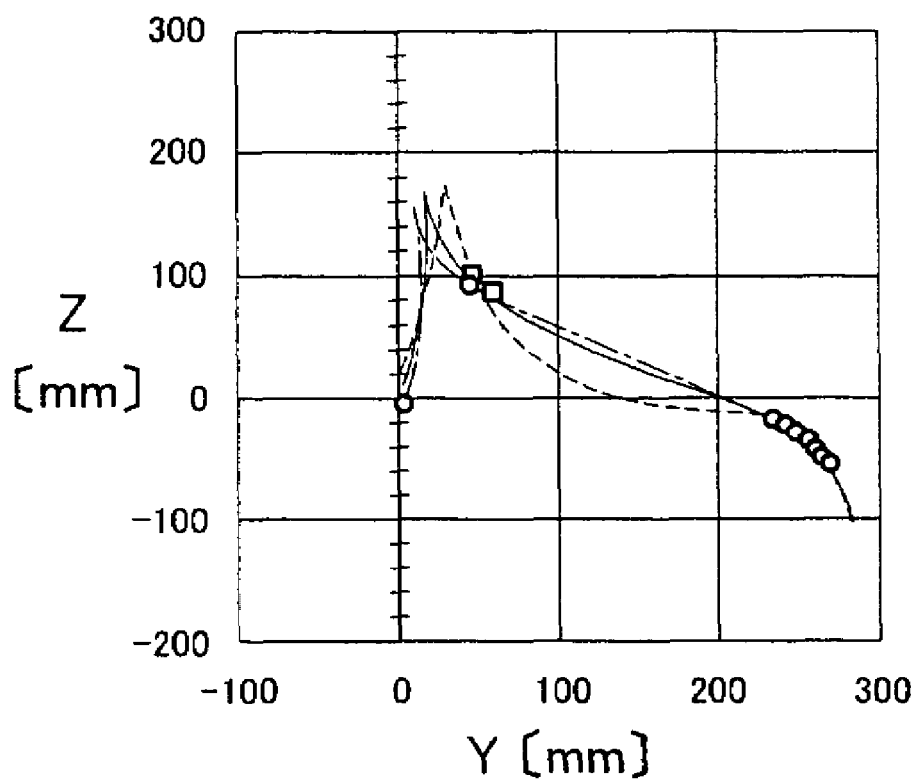
FIG. 23 is another graph (y-z plane) showing the control cable routing arrangement that was calculated assuming that the clamping device was disposed near the grommet.
Figure 24:
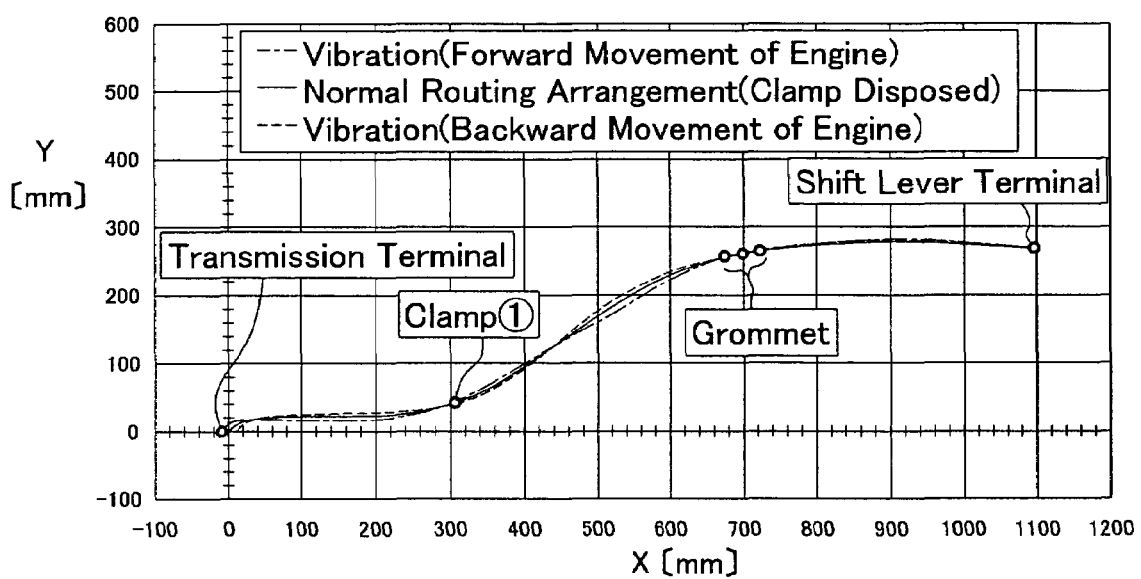
FIG. 24 is a graph (x-y plane) showing the control cable routing arrangement that was calculated assuming that the clamping device was not disposed near the grommet.
Figure 25:
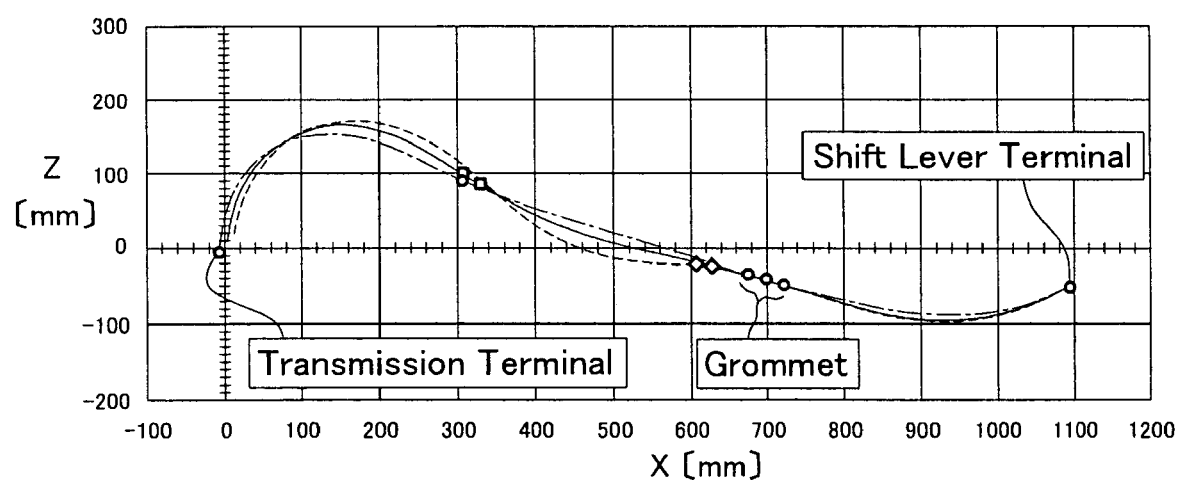
FIG. 25 is another graph (x-z plane) showing the control cable routing arrangement that was calculated assuming that the clamping device was not disposed near the grommet.
Figure 26:
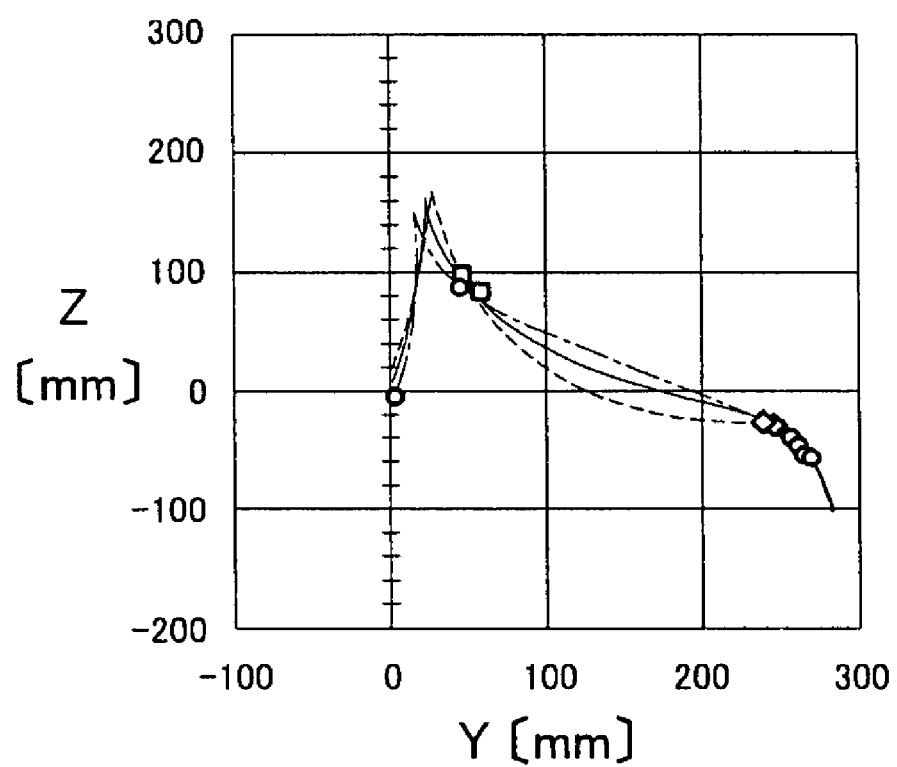
FIG. 26 is another graph (y-z plane) showing the control cable routing arrangement that was calculated assuming that the clamping device was not disposed near the grommet.

FIGS. 21 through 26 show calculated routing arrangements for the control cable. FIGS. 21 to 23 show an example of a computation performed when the clamping device (shown as clamp (2) in FIG. 17) is disposed near the grommet. FIGS. 21, 22, and 23 show the cable routing arrangements in an x-y plane, an x-z plane, and a y-z plane, respectively. On the other hand, FIGS. 24 to 26 show an example of another computation performed when the clamping device (clamp (2)) near the grommet is removed. FIGS. 24, 25, and 26 show the cable routing arrangements in the x-y plane, the x-z plane, and the y-z plane, respectively.

In addition, the engine, which is shown in FIG. 17, vibrates back and forth. The transmission device attached to the engine also vibrates back and forth. Therefore, each of FIGS. 21 through 26 shows the examples of the cable routing arrangement, which was computed assuming that: (1) the engine vibrated forward (i.e. the connected end of the control cable, which end was connected to the transmission device, vibrated forward); (2) the engine did not vibrate; and (3) the engine vibrated backward.

(A) Evaluation of Clamping Conditions of Clamping Device (Clamp (2))

The clamping conditions (clamping position, clamping direction) of the clamping device (clamp (2)) were evaluated from the calculated routing arrangement. The clamping conditions were evaluated by two criteria: a distance between the position (i.e. the position of each node, $L_k$, $C_k$, $R_k$) of the control cable, which was obtained from the computed routing arrangement, and the position of the disposed clamp, hereinafter referred to as criterion (A-1); and a distance between the axial direction (the direction of each node $L_k$, $C_k$, $R_k$) of the control cable, which was obtained from the computed routing arrangement, and the direction of the axis of the clamping device, hereinafter referred to as criterion (A-2). In each criteria (A-1), (A-2), whether the distance is beyond a threshold or not is judged. In the case of (A-1), the threshold is set for the direction of each distance, taking a connected direction and disconnected direction of the control cable into account.

The result of the evaluation by criterion (A-1) showed that the distance between the control cable and the clamping device is very little and, therefore, insignificant. It was confirmed that a great force does not act between the control cable and the clamping device.

Figure 27:
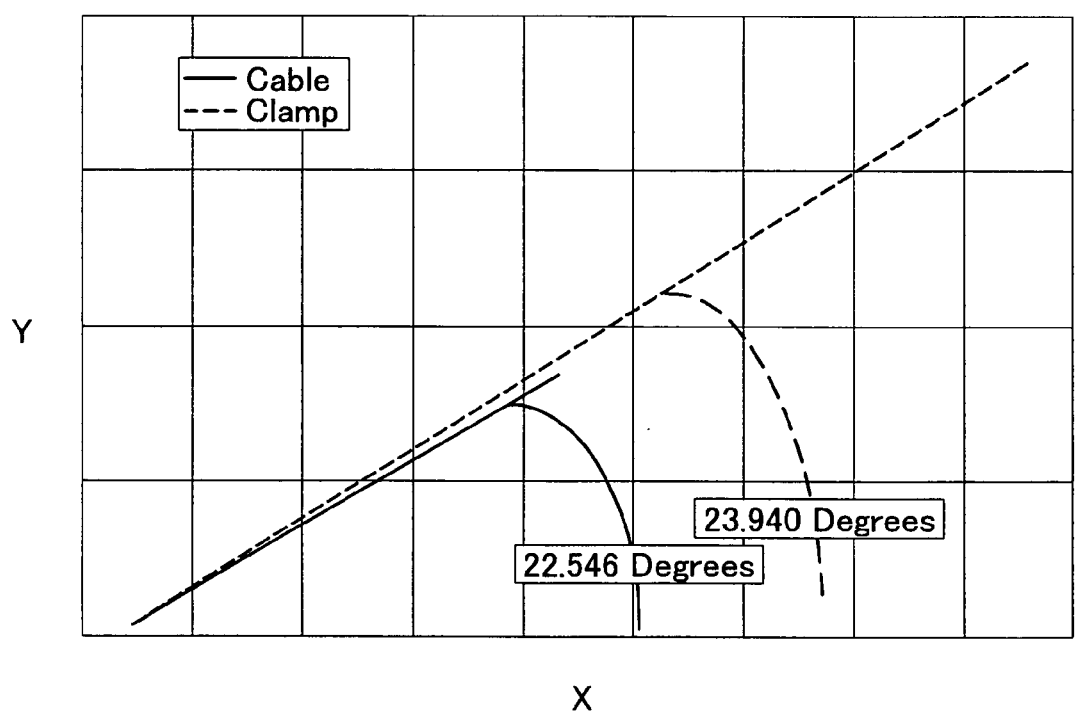
FIG. 27 is an enlarged view (x-y plane) showing displacement of a cable axis and a clamp axis from each other in a clamping part.
Figure 28:
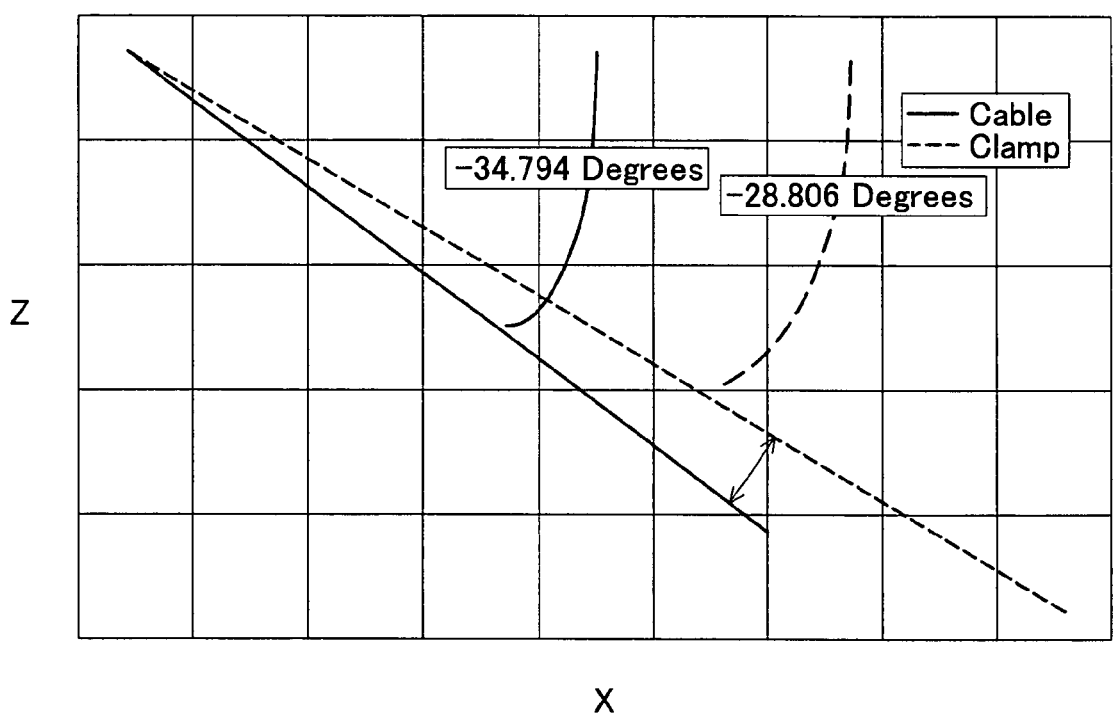
FIG. 28 is another enlarged view (x-z plane) showing the displacement of the cable axis and the clamp axis from each other in the clamping part.

The result of the evaluation by criterion (A-2) is shown in FIGS. 27 and 28. FIG. 27 shows a distance between the cable axis and the clamp axis in the x-y plane. FIG. 28 shows a distance, between the cable axis and the clamp axis in the x-z plane. The evaluation was performed using the routing arrangement that was computed assuming that the engine was not vibrating.

As is clear from FIG. 27, in the x-y plane, the cable axis and the clamp axis are almost in the same direction. On the other hand, in the x-z plane, a difference in the cable axis and the clamp axis is about 6°. As is obvious from the structure of the clamping device (refer to FIG. 18), the control cable is attached to the clamping device by being moved from a lower to higher position (i.e. in the z direction). Therefore, the direction of displacement of the cable axis from the clamp axis (i.e. opposite the z direction in the x-z plane) is the same as the direction in which the control cable is detached. Accordingly, judging from the result of the computation, the control cable may become detached from the clamping device easily. In such a case, clamping conditions of the clamping device should be changed.

Thus, from the cable routing arrangement that has been computed, whether the clamping conditions of the clamping device is appropriate or not can be determined. Accordingly, the optimum clamping conditions for the clamping device can be determined without actually preparing the experimental control cable.

(B) Evaluation of Durability

Figure 29:
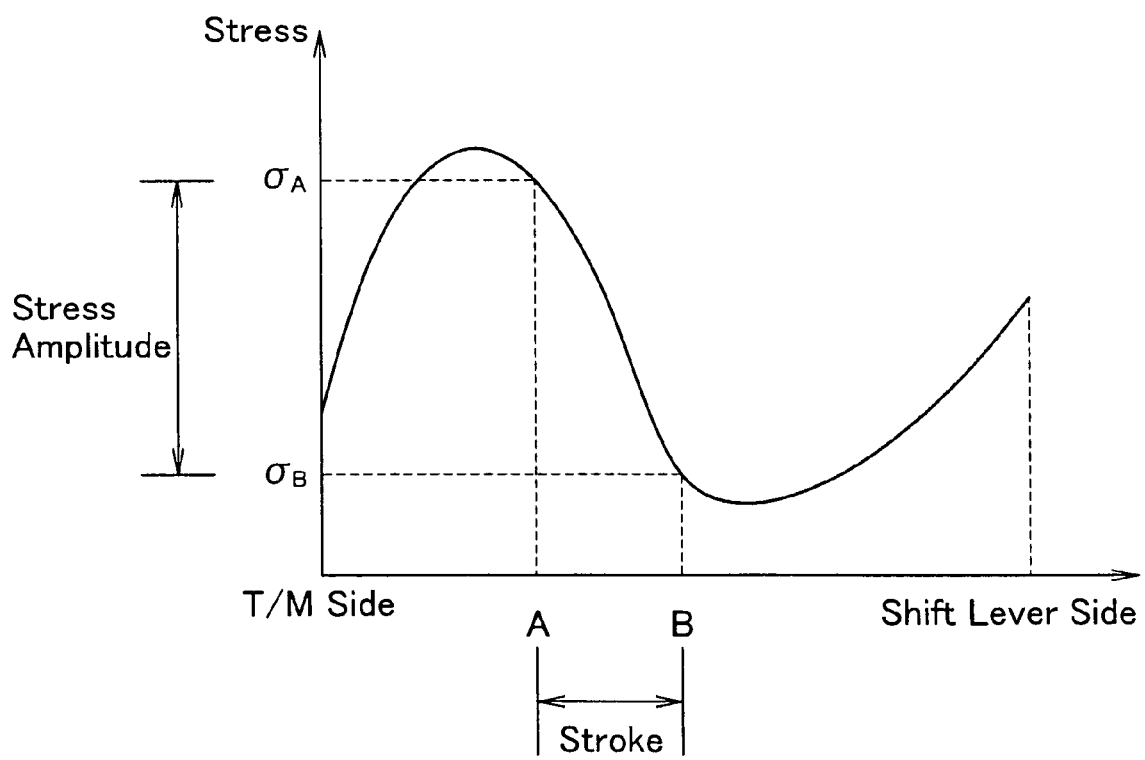
FIG. 29 is a graph schematically showing stress on each part of an inner cable when the outer cable is laid along the calculated routing arrangement.

Now, a method for evaluating the durability from the calculated routing arrangement will be explained with reference to FIG. 29. FIG. 29 shows stress on each part of the inner cable when the outer cable is laid in the computed routing arrangement.

As stated above, the routing arrangement of the control cable coincides with the routing arrangement of the outer cable. Also, the routing arrangement of the outer cable coincides with the routing arrangement of the inner cable. Therefore, the curvature radius of each part of the inner cable can be obtained from the calculated routing arrangement. From the curvature radius, bending stress on each part of the inner cable can be calculated. On the other hand, an operating force (compressive force, tensile force), when the shift lever is manipulated, acts on the inner cable. That is, the bending stress and the compressive stress or tensile stress, which is produced by the operating force, is applied to the inner cable. Thus-obtained stress on each part of the inner cable are schematically shown in FIG. 29.

In addition, the inner cable axially moves within the outer cable by being guided along the outer cable. A change in stress of the inner cable (for example, at point A), when the shift lever is manipulated, will now be described. The inner cable (point A) is assumed to be moved to point B by the operation of the shift lever. As clearly shown in FIG. 29, the stress of the inner cable (point A) before the shift lever was manipulated is $\sigma_A$, and the stress (point A) after the operation is $\sigma_B$. Therefore, a stress amplitude of the inner cable (point A) is $\sigma_A - \sigma_B$. In such a manner, the stress amplitude of each part of the inner cable can be calculated. After the stress amplitude of each part of the inner cable is calculated, the maximum value of the calculated stress amplitude and a fatigue limit, which was obtained from an S-N curve, are compared thereby evaluating the durability.

Figure 30:
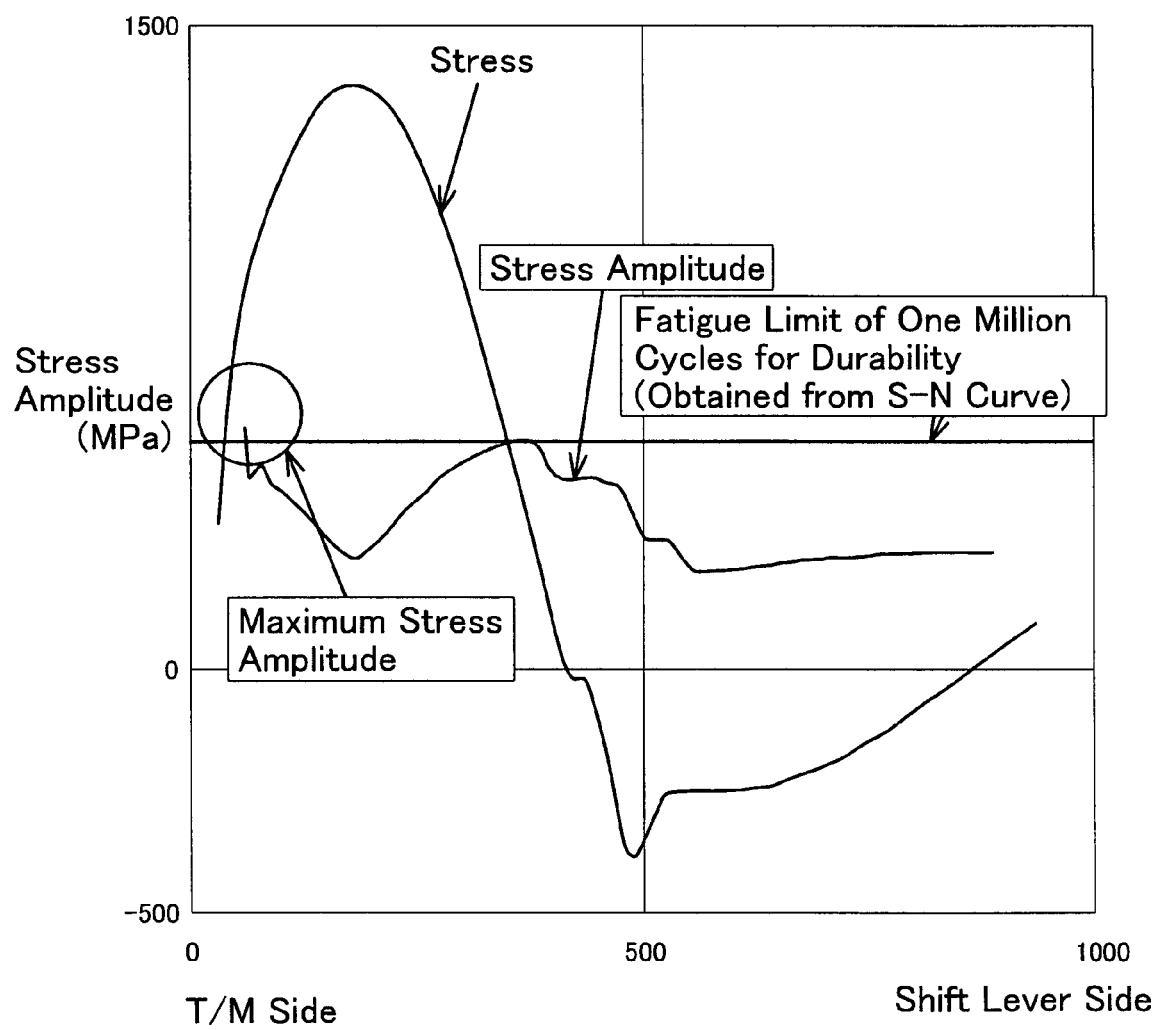
FIG. 30 is a graph showing an example of an evaluation of durability of the control cable from the calculated routing arrangement.

FIG. 30 shows an example of the evaluation of the durability of the calculated routing arrangement. As shown in FIG. 30, the stress amplitude was greatest at the cable end connected to the transmission device. The stress amplitude was greater than the fatigue limit. This indicated that the inner cable might be damaged near the end connected to the transmission device. Accordingly, it was determined that the cable routing arrangement had to be re-calculated, or the material of the inner cable had to be altered.

(C) Calculation of Load Efficiency and Backlash

In order to calculate load efficiency and backlash, a total bending angle is first calculated from the calculated routing arrangement. After the total bending angle is calculated, the load efficiency and the backlash are obtained from the equations described below.

Load efficiency: $\eta = \text{EXP}(-\mu \cdot \theta)$

Backlash: $b = C \cdot \theta + \alpha$

θ: total bending angle
μ: coefficient of friction between the inner cable and outer cable
C: clearance between the inner cable and outer cable
α: other play After the load efficiency and backlash are obtained, whether the values satisfy the design specification or not is determined.

(D) Consideration of Need for Clamping Device (Clamp (2))

Whether the clamping device (clamp (2)) was necessary or not was considered by calculating a routing arrangement for the control cable to which the clamping device (clamp (2)) was not attached. Herein, an amount of friction between the control cable and the grommet was evaluated based upon a variation in the cable routing arrangement, which was caused by vibration of the engine. From the amount of friction, the need for the clamping device was determined. The amount of friction was evaluated by an amount of movement of the node that is in contact with the grommet (i.e. an amount of movement of the node due to the variation in the cable routing arrangement). Specifically, a distance between the position of the node when the engine moved forward in the vibration and the position of the node when the engine moved backward in the vibration was obtained, and then the amount of friction was evaluated by the obtained distance.

It is obvious from the comparison between FIGS. 22 and 25 that if the clamping device (clamp (2)), which is disposed further forward than the grommet, is removed, the control cable would axially move in the vicinity of the grommet greatly. The great movement of the control cable causes wear of grommet, which results in the grommet sealing unsatisfactorily. Therefore, it is difficult to obviate the need for the clamping device (clamp (2)).

(Second Representative Embodiment)

Figure 31:
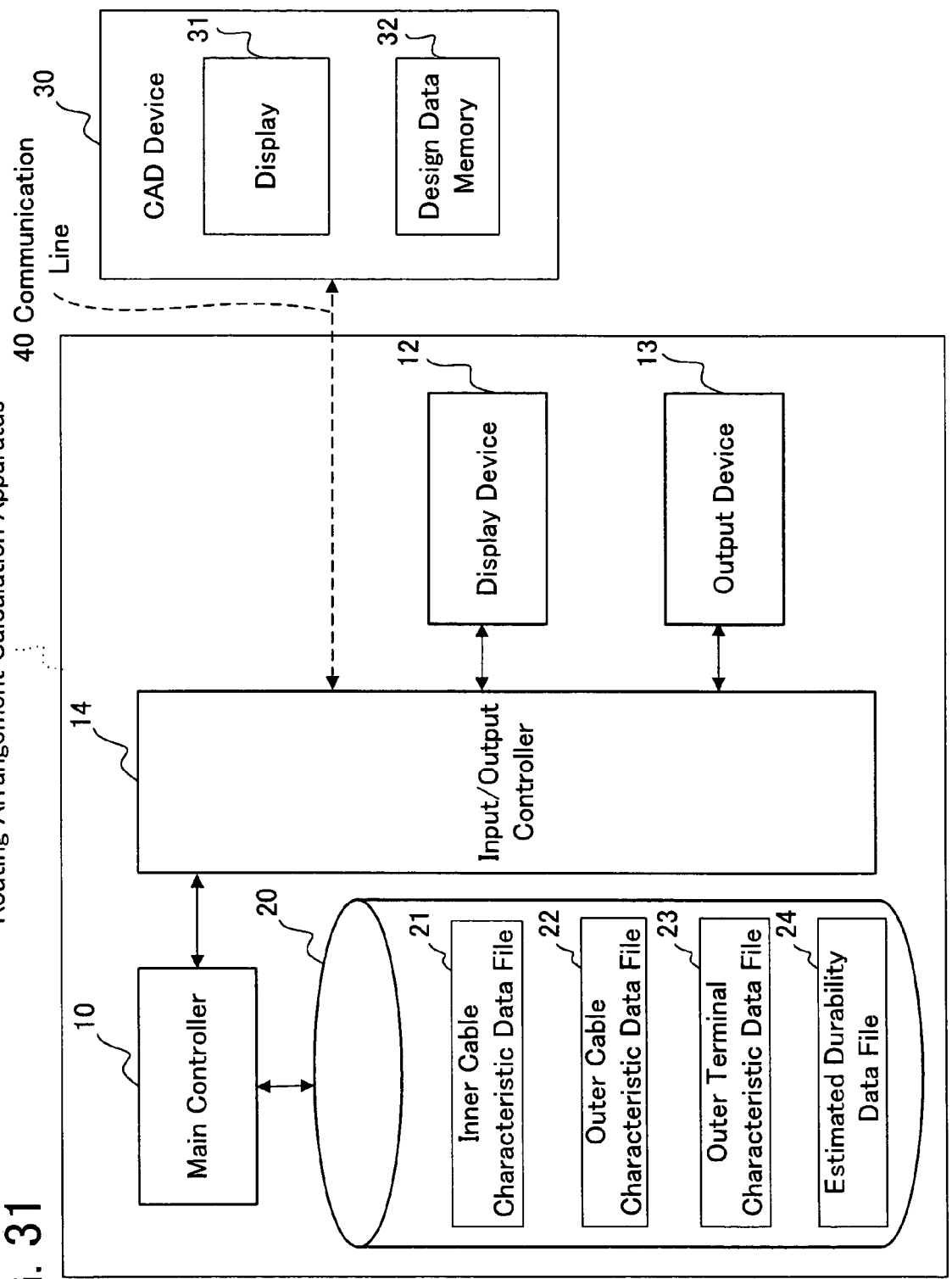
FIG. 31 is a hardware configuration diagram of a routing arrangement calculation apparatus according to a second representative embodiment.

A cable routing arrangement calculation apparatus according to the second representative embodiment will now be described with reference to FIG. 31. FIG. 31 is a hardware configuration diagram of a routing arrangement calculation apparatus according to the second representative embodiment.

In the cable routing arrangement calculation apparatus of the second representative embodiment, the basic structure (e.g. a process for calculating a cable routing arrangement, a process for determining characteristics of a control cable, the contents of each of files that are held in a database) is the same as the basic structure of the cable routing arrangement calculation apparatus of the first representative embodiment, which was illustrated above. The features of the second representative embodiment, which are different from those of the first representative embodiment, are: (1) the cable routing arrangement calculation apparatus is connected to a CAD device via a communication line, and (2) interference of the control cable can be determined by using design data that is stored in the CAD device [i.e. design data of a device (e.g. a vehicle) in which the control cable is laid]. The different features will be mainly discussed below.

With reference to FIG. 31, CAD device 30 is connected, via communication line 40, to input/output controller 14 of the cable routing arrangement calculation apparatus. CAD device 30 includes display 31 and design data memory device 32. Design data memory device 32 stores design data of each of component parts of a device that is provided with the control cable (hereinafter called "cabled device").

Basically, a cable routing arrangement calculation according to the second representative embodiment is carried out following a flowchart shown in FIG. 2. In the second representative embodiment, interference between the control cable and the cabled device is determined using a cable routing arrangement calculated in step S10.

Specifically, after the cable routing arrangement is calculated, main controller 10 reads the design data of the cabled device (e.g. each component of a vehicle), which is stored in design data memory device 32. Then, it is determined whether or not the cabled device resides within a predetermined distance (i.e. a distance appropriately determined by a designer) from each part of the calculated routing arrangement. If the cabled device resides within the predetermined distance, it is determined that the possibility of interference between the control cable and the cabled device is high. This determination result will be shown on display 12. Consequently, from the displayed determination result, whether the control cable can be laid under the entered conditions or not can be determined.

Further, main controller 10 creates display data in order to show the calculated routing arrangement and the outer shape of the cabled device onto display 31 of CAD device 30 at the same time. As the display data that is input to CAD device 30, data obtained by converting the cable routing arrangement calculated by the "ABAQUS" into an "EXCEL" type of data can be used. The data converted in the "EXCEL" type of data is input to CAD device 30. Using the created display data, CAD device 30 simultaneously displays the control cable and the outer shape of the cabled device.

By viewing images shown on display 31, the designer can grasp an empty space between the control cable and the cabled device in a visual way. Thus, the designer can find a position where the interference between the control cable and the cabled device occurs.

The preferred embodiments of the present invention have been explained in detail above. However, these are only examples. The present invention can be embodied in a variety of improved configurations that include a multitude of changes and improvements based upon the knowledge and skill in the art.

For instance, in the above described embodiments, the forces (torques) that act on both terminal were obtained from the first calculation of the cable routing arrangement and then the second calculation of the cable routing arrangement was performed assuming that the calculated forces (torques) respectively acted on the ends; however, the process (the calculation of the forces that act on both the terminals and recalculation of the cable routing arrangement in which the calculated forces are assumed to act on the corresponding terminals) may be repeated several times. By repeating the process, the forces (torques) that act on both the ends can be obtained more accurately. Accordingly, precision in the calculation of the cable routing arrangement can be enhanced. In this case, the process may be repeated until variations in the calculated forces (torques) that act on both the ends converge into a predetermined range.

In addition, the computing conditions for calculating the cable routing arrangement are not limited to the above illustrated embodiments. A designer may appropriately increase or decrease the conditions according to each device that uses the control cable.

In addition, as the factors relating to the durability, not only the smallest bending radius and the total bending angle but also other factors can also be taken into consideration in order to estimate the durability.

Further, from the calculated routing arrangement, the control cable performance (e.g. slide resistance, stroke loss, buckling load, NV value) may be estimated.

What is claimed is:

1. A method for calculating a cable route for a control cable, the method comprising the steps of:
    determining a cable length of the control cable;
    determining cable connecting conditions of the control cable, wherein the cable connecting conditions include connecting positions for both ends of the control cable and a direction of a cable axis in each of the connecting positions;
    obtaining a characteristic of the control cable; and
    performing a numerical analysis by using the obtained characteristic of the control cable, the determined cable length, and the determined cable connecting conditions, thereby calculating the cable route of the control cable in a case where each of the ends of the control cable are fixed in the determined connecting positions and the determined directions of the cable axis, wherein the obtaining step comprises the steps of obtaining a characteristic of an outer cable and a characteristic of an inner cable separately, and determining the characteristic of the control cable from the obtained characteristics of the outer cable and inner cable.

2. A method for calculating a routing arrangement for a control cable from a given cable length and a given condition for connecting the cable, the method comprising the steps of:
    obtaining a characteristic of a control cable;
    obtaining a characteristic of an outer terminal; and
    performing a numerical analysis by using the obtained characteristic of the control cable, the obtained characteristic of the outer terminal, the given cable length, and the given condition for connecting the cable,
    wherein at least a torsion characteristic of the outer terminal is obtained in the terminal characteristic obtaining step, and the method further comprises the steps of:
    (1) calculating the routing arrangement by conducting the performing step assuming that torque does not act on the outer terminal from the control cable;
    (2) calculating the torque, which acts on the outer terminal from the control cable, based upon the calculated routing arrangement; and
    (3) re-calculating the routing arrangement by conducting the performing step assuming that the calculated torque acts on the outer terminal.

3. A method for estimating durability of a control cable from the routing arrangement that was calculated by a method according to claim 2 the method comprising the steps of:
    calculating bending stress, which acts on each part of the inner cable, based upon the calculated routing arrangement;
    calculating tensile stress or compressive stress that acts in the axial direction of the inner cable from a manipulating load;
    calculating composite stress on each point of the inner cable by using the calculated bending stress and the calculated tensile stress or compressive stress;
    calculating a stress amplitude of each point of the inner cable by using a manipulation movement and the calculated composite stress on each point of the inner cable; and
    evaluating the durability of the inner cable by comparing the calculated stress amplitude and a fatigue limit of the inner cable.

4. A method for calculating a routing arrangement for a control cable from a given cable length and a given condition for connecting the cable, the method comprising the steps of:
    obtaining a characteristic of a control cable;
    obtaining a characteristic of an outer terminal;
    performing a numerical analysis by using the obtained characteristic of the control cable, the obtained characteristic of the outer terminal, the given cable length, and the given condition for connecting the cable;
    calculating the routing arrangement by conducting the performing step assuming that a force does not act on the outer terminal from the control cable;
    calculating the force, which acts on the outer terminal from the control cable, based upon the calculated routing arrangement;
    correcting the characteristic of the outer terminal to a characteristic that is obtained when the calculated force acts on the outer terminal; and
    re-calculating the routing arrangement by conducting the performing step using the corrected characteristic of the outer terminal.

5. A method for estimating durability of a control cable from the routing arrangement that was calculated by a method according to claim 4, the method comprising the steps of:
    calculating bending stress, which acts on each part of the inner cable, based upon the calculated routing arrangement;
    calculating tensile stress or compressive stress that acts in the axial direction of the inner cable from a manipulating load;
    calculating composite stress on each point of the inner cable by using the calculated bending stress and the calculated tensile stress or compressive stress;
    calculating a stress amplitude of each point of the inner cable by using a manipulation movement and the calculated composite stress on each point of the inner cable; and
    evaluating the durability of the inner cable by comparing the calculated stress amplitude and a fatigue limit of the inner cable.

6. A method for estimating durability of a control cable from a method for calculating a routing arrangement for a control cable from a given cable length and a given condition for connecting the cable, the method for calculating a routing arrangement for a control cable from a given cable length and a given condition for connecting the cable comprising the steps of:
    obtaining a characteristic of the control cable; and
    performing a numerical analysis by using the obtained characteristic of the control cable, the given cable length, and the given condition for connecting the cable; and the method for estimating durability of a control cable comprising the steps of:

calculating bending stress, which acts on each part of the inner cable, based upon the calculated routing arrangement;

calculating tensile stress or compressive stress that acts in the axial direction of the inner cable from a manipulating load;

calculating composite stress on each point of the inner cable by using the calculated bending stress and the calculated tensile stress or compressive stress;

calculating a stress amplitude of each point of the inner cable by using a manipulation movement and the calculated composite stress on each point of the inner cable; and evaluating the durability of the inner cable by comparing the calculated stress amplitude and a fatigue limit of the inner cable.

7. An apparatus for calculating a cable route for a control cable, comprising:

means for entering a characteristic of the control cable;

means for entering a length of the control cable;

means for entering a condition for connecting the control cable, the entering condition means entering connecting positions for both ends of the control cable and a direction of a cable axis in each of the connecting positions; and means for calculating the cable route by performing a numerical analysis using the entered control cable characteristic, the entered control cable length, and the entered control cable connection condition, the calculating means calculating the cable route of the control cable in a case where the each ends of the control cable are fixed in the determined connecting positions and the determined directions of the cable axis, wherein the cable characteristic entering means enters a characteristic of an outer cable and a characteristic of an inner cable separately, and the cable route calculating means determines the characteristic of the control cable from the entered characteristics of the outer cable and inner cable and performs the numerical analysis by using the determined characteristic of the control cable.

8. An apparatus as in claim 7, further comprising a cable characteristic data file that stores the control cable characteristic for each type of the control cable, wherein the cable characteristic entering means enters a type of the control cable, and the cable route calculating means searches the cable characteristic data file for the entered type of the cable in order to read the characteristic of the control cable and performs the numerical analysis by using the read characteristic of the control cable.

9. A method for estimating durability of a control cable from a method for calculating a routing arrangement for a control cable from a given cable length and a given condition for connecting the cable, the method for calculating a routing arrangement for a control cable from a given cable length and a given condition for connecting the cable comprising the steps of:

obtaining a characteristic of the control cable; and performing a numerical analysis by using the obtained characteristic of the control cable, the given cable length, and the given condition for connecting the cable, wherein the obtaining step comprises the steps of obtaining a characteristic of an outer cable and a characteristic of an inner cable separately, and determining the characteristic of the control cable from the obtained characteristics of the outer cable and inner cable; and the method for estimating durability of a control cable comprising the steps of:

calculating bending stress, which acts on each part of the inner cable, based upon the calculated routing arrangement;

calculating tensile stress or compressive stress that acts in the axial direction of the inner cable from a manipulating load;

calculating composite stress on each point of the inner cable by using the calculated bending stress and the calculated tensile stress or compressive stress;

calculating a stress amplitude of each point of the inner cable by using an manipulation movement and the calculated composite stress on each point of the inner cable; and evaluating the durability of the inner cable by comparing the calculated stress amplitude and a fatigue limit of the inner cable.

10. A method for estimating durability of a control cable from a method for calculating a routing arrangement for a control cable from a given cable length and a given condition for connecting the cable, the method for calculating a routing arrangement for a control cable from a given cable length and a given condition for connecting the cable comprising the steps of:

obtaining a characteristic of a control cable;

obtaining a characteristic of an outer terminal; and performing a numerical analysis by using the obtained characteristic of the control cable, the obtained characteristic of the outer terminal, the given cable length, and the given condition for connecting the cable; and the method for estimating durability of a control cable comprising the steps of:

calculating bending stress, which acts on each part of the inner cable, based upon the calculated routing arrangement;

calculating tensile stress or compressive stress that acts in the axial direction of the inner cable from a manipulating load;

calculating composite stress on each point of the inner cable by using the calculated bending stress and the calculated tensile stress or compressive stress;

calculating a stress amplitude of each point of the inner cable by using a manipulation movement and the calculated composite stress on each point of the inner cable; and evaluating the durability of the inner cable by comparing the calculated stress amplitude and a fatigue limit of the inner cable.

11. A method for calculating a cable route for a control cable, the method comprising the steps of:

determining a cable length of the control cable;

determining cable connecting conditions of the control cable, wherein the cable connecting conditions include connecting positions for both ends of the control cable and a direction of a cable axis in each of the connecting positions;

obtaining a characteristic of the control cable; and performing a numerical analysis by using the obtained characteristic of the control cable, the determined cable length, and the determined cable connecting conditions, thereby calculating the cable route of the control cable in a case where each of the ends of the control cable are fixed in the determined connecting positions and the determined directions of the cable axis, wherein the cable connecting conditions further include a position of a clamping point, at which the control cable is clamped, and clamping conditions for the clamping point.

12. A method for calculating a cable route for a control cable, the method comprising the steps of:

determining a cable length of the control cable;

determining cable connecting conditions of the control cable, wherein the cable connecting conditions include connecting positions for both ends of the control cable and a direction of a cable axis in each of the connecting positions;

obtaining a characteristic of the control cable; and performing a numerical analysis by using the obtained characteristic of the control cable, the determined cable length, and the determined cable connecting conditions, thereby calculating the cable route of the control cable in a case where each of the ends of the control cable are fixed in the determined connecting positions and the determined directions of the cable axis, the method further comprising the steps of calculating a total bending angle from the calculated cable route and calculating a load efficiency of the control cable.

* * * * *